(12) United States Patent
Zhang

(10) Patent No.: US 7,817,274 B2
(45) Date of Patent: Oct. 19, 2010

(54) COMPACT SPECTROMETER

(76) Inventor: Jingyun Zhang, 2490 Partridge Dr., Upper St. Clair, PA (US) 15241

( * ) Notice: Subject to any disclaimer, the term of this patent is extended or adjusted under 35 U.S.C. 154(b) by 151 days.

(21) Appl. No.: 12/149,563

(22) Filed: May 5, 2008

(65) Prior Publication Data

US 2009/0091754 A1 Apr. 9, 2009

Related U.S. Application Data

(60) Provisional application No. 60/997,983, filed on Oct. 5, 2007.

(51) Int. Cl.
*G01J 3/28* (2006.01)
(52) U.S. Cl. .................................................. 356/328
(58) Field of Classification Search .................. None
See application file for complete search history.

(56) References Cited

U.S. PATENT DOCUMENTS

| | | | |
|---|---|---|---|
| 887,357 A | 5/1908 | Stubblefield |
| 2,723,589 A | 11/1955 | Bullock et al. |
| 3,572,933 A | 3/1971 | Boostrom |
| 3,578,866 A | 5/1971 | Kohler et al. |
| 3,625,615 A | 12/1971 | Wilson |
| 3,663,762 A | 5/1972 | Joel |
| 3,680,957 A | 8/1972 | Fukuda |
| 3,775,010 A | 11/1973 | Chupp et al. |
| 3,888,590 A | 6/1975 | White |
| 3,906,166 A | 9/1975 | Cooper et al. |
| 3,917,403 A | 11/1975 | Chupp et al. |
| 3,923,399 A | 12/1975 | Brumley |
| 4,025,196 A | 5/1977 | Chupp et al. |
| 4,043,670 A | 8/1977 | Kozlov et al. |
| 4,225,233 A | 9/1980 | Ogan |
| 4,310,244 A | 1/1982 | Perkins et al. |
| 4,315,691 A | 2/1982 | Perkins et al. |
| 4,399,555 A | 8/1983 | MacDonald et al. |

(Continued)

FOREIGN PATENT DOCUMENTS

EP 1 528 380 A1 5/2005

(Continued)

OTHER PUBLICATIONS

Carl Zeiss, "Monolithic Miniature Spectrometer—MMS 1," Photonics Spectra, May 1994, p. 91.

(Continued)

*Primary Examiner*—Tu T Nguyen
(74) *Attorney, Agent, or Firm*—Oliff & Berridge, PLC

(57) ABSTRACT

Spectrometers, particularly compact spectrometers, are constructed with their spectral performance characteristics being optimized as well as with their instrument/device volume being reduced significantly. The light propagation path, either in transparent media or in free space, of the optical beams emitting from a small input aperture/slit of a spectrometer, is caused to be two-dimensional or unilateralized (propagating within a thin layer of air or media), enabling physical sizes of any optical elements needed thereafter to construct a spectrometer to be reduced significantly in one dimension. As a result, a significant reduction of instrument/device volume (in one dimension or even in two dimensions) is achieved, which is applicable to and beneficial to either a classical dispersion spectrometer or a compact dispersion spectrometer.

75 Claims, 7 Drawing Sheets

U.S. PATENT DOCUMENTS

| | | | |
|---|---|---|---|
| 4,441,815 A | 4/1984 | Izumi | |
| 4,462,688 A | 7/1984 | Gold | |
| 4,469,441 A | 9/1984 | Bernier et al. | |
| 4,553,253 A | 11/1985 | Petersen | |
| 4,568,187 A | 2/1986 | Kita et al. | |
| 4,573,793 A | 3/1986 | Sasaki | |
| 4,613,233 A | 9/1986 | Wilson | |
| 4,623,251 A | 11/1986 | Pouey | |
| 4,644,632 A | 2/1987 | Mächler et al. | |
| 4,652,761 A | 3/1987 | Kerr et al. | |
| 4,657,390 A * | 4/1987 | Doyle | 356/451 |
| 4,697,924 A | 10/1987 | Akiyama | |
| 4,705,396 A | 11/1987 | Bergstrom | |
| 4,717,254 A | 1/1988 | Masuda | |
| 4,732,476 A | 3/1988 | Barshad | |
| 4,743,112 A | 5/1988 | Burke | |
| 4,744,618 A | 5/1988 | Mahlein | |
| 4,752,130 A | 6/1988 | George et al. | |
| 4,776,696 A | 10/1988 | Hettrick et al. | |
| 4,784,935 A | 11/1988 | Ehrfeld et al. | |
| 4,815,849 A | 3/1989 | Sullivan | |
| 4,832,491 A | 5/1989 | Sharpe et al. | |
| 4,838,645 A | 6/1989 | Machler et al. | |
| 4,938,553 A | 7/1990 | Maerz et al. | |
| 4,973,159 A | 11/1990 | Sohma et al. | |
| 4,983,039 A | 1/1991 | Harada et al. | |
| 4,984,888 A | 1/1991 | Tobias | |
| 4,995,724 A | 2/1991 | Sonobe et al. | |
| 4,997,281 A | 3/1991 | Stark | |
| 4,999,489 A | 3/1991 | Huggins | |
| 5,020,910 A | 6/1991 | Dunn et al. | |
| 5,026,160 A | 6/1991 | Dorain et al. | |
| 5,050,992 A | 9/1991 | Drummond et al. | |
| 5,078,495 A | 1/1992 | Harada et al. | |
| 5,122,127 A | 6/1992 | Stanley | |
| 5,127,728 A | 7/1992 | Warren et al. | |
| 5,139,335 A | 8/1992 | Lundeen et al. | |
| 5,159,404 A | 10/1992 | Bittner | |
| 5,173,748 A | 12/1992 | Bilhorn | |
| 5,182,609 A | 1/1993 | Florek et al. | |
| 5,192,981 A | 3/1993 | Slutter et al. | |
| 5,223,913 A | 6/1993 | Ando et al. | |
| 5,231,462 A | 7/1993 | Dschen | |
| 5,233,405 A | 8/1993 | Wildnauer et al. | |
| 5,257,086 A | 10/1993 | Fateley et al. | |
| 5,260,767 A | 11/1993 | Cook | |
| 5,265,158 A | 11/1993 | Tattari | |
| 5,285,254 A | 2/1994 | De Sa | |
| 5,305,082 A | 4/1994 | Bret | |
| 5,319,437 A | 6/1994 | Van Aken et al. | |
| 5,359,409 A | 10/1994 | Wildnauer et al. | |
| 5,384,656 A * | 1/1995 | Schwenker | 359/569 |
| 5,402,227 A | 3/1995 | Schuma | |
| 5,424,826 A | 6/1995 | Kinney | |
| 5,457,530 A | 10/1995 | Nagai | |
| 5,493,393 A | 2/1996 | Beranek et al. | |
| 5,497,231 A | 3/1996 | Schmidt | |
| 5,504,575 A | 4/1996 | Stafford | |
| 5,528,364 A | 6/1996 | Koike | |
| 5,532,818 A | 7/1996 | Tokumoto | |
| 5,550,375 A | 8/1996 | Peters et al. | |
| 5,557,404 A | 9/1996 | Matsui et al. | |
| 5,570,180 A | 10/1996 | Nagai | |
| 5,631,735 A | 5/1997 | Nagai | |
| 5,652,681 A | 7/1997 | Chen et al. | |
| 5,657,121 A | 8/1997 | Nishina | |
| 5,710,627 A | 1/1998 | Inoue et al. | |
| 5,717,487 A | 2/1998 | Davies | |
| 5,722,067 A | 2/1998 | Fougnies et al. | |
| 5,748,310 A | 5/1998 | Fujiyoshi | |
| 5,754,290 A | 5/1998 | Rajic et al. | |
| 5,767,966 A | 6/1998 | Iwasaki | |
| 5,781,290 A | 7/1998 | Bittner et al. | |
| 5,784,159 A | 7/1998 | Iwasaki | |
| 5,801,831 A | 9/1998 | Sargoytchev | |
| 5,812,262 A | 9/1998 | Ridyard et al. | |
| 5,818,586 A | 10/1998 | Lehto et al. | |
| 5,825,484 A | 10/1998 | Iwasaki | |
| 5,841,856 A | 11/1998 | Ide | |
| D405,457 S | 2/1999 | Kawashima | |
| 5,880,833 A | 3/1999 | Iwasaki | |
| 5,880,834 A | 3/1999 | Chrisp | |
| 5,909,280 A | 6/1999 | Zavracky | |
| 5,923,420 A | 7/1999 | Iwasaki | |
| 5,949,541 A | 9/1999 | Merle | |
| 6,016,197 A | 1/2000 | Krivoshlykov | |
| 6,023,330 A | 2/2000 | Marshall et al. | |
| 6,057,925 A | 5/2000 | Anthon | |
| 6,061,129 A | 5/2000 | Ershov et al. | |
| 6,078,048 A | 6/2000 | Stevens et al. | |
| 6,081,331 A | 6/2000 | Teichmann | |
| 6,100,974 A | 8/2000 | Reininger | |
| 6,119,031 A | 9/2000 | Crowley et al. | |
| 6,122,051 A | 9/2000 | Ansley et al. | |
| 6,128,078 A | 10/2000 | Fateley | |
| 6,151,112 A | 11/2000 | Atkinson et al. | |
| 6,166,805 A | 12/2000 | Mori et al. | |
| 6,208,413 B1 | 3/2001 | Diehl et al. | |
| D441,733 S | 5/2001 | Do et al. | |
| 6,238,348 B1 | 5/2001 | Crowley et al. | |
| 6,243,170 B1 | 6/2001 | Ershov | |
| 6,249,348 B1 | 6/2001 | Jung et al. | |
| 6,266,140 B1 | 7/2001 | Xiang et al. | |
| 6,288,781 B1 | 9/2001 | Lobb | |
| 6,303,934 B1 | 10/2001 | Daly et al. | |
| 6,343,227 B1 | 1/2002 | Crowley | |
| 6,359,693 B2 | 3/2002 | Smith et al. | |
| 6,362,878 B1 | 3/2002 | Wang et al. | |
| 6,362,888 B1 | 3/2002 | Jung et al. | |
| 6,373,573 B1 | 4/2002 | Jung et al. | |
| 6,405,073 B1 | 6/2002 | Crowley et al. | |
| 6,411,382 B1 | 6/2002 | Nishina | |
| 6,441,900 B1 | 8/2002 | Fujiyoshi | |
| 6,452,674 B1 | 9/2002 | Fujiyoshi | |
| 6,507,398 B1 | 1/2003 | Arai et al. | |
| 6,522,403 B2 | 2/2003 | Wilson et al. | |
| 6,538,737 B2 | 3/2003 | Sandstrom et al. | |
| 6,549,281 B2 | 4/2003 | Tokumoto | |
| 6,583,873 B1 | 6/2003 | Goncharov et al. | |
| 6,587,198 B2 | 7/2003 | Olshausen | |
| 6,590,660 B2 | 7/2003 | Jung et al. | |
| 6,597,452 B1 | 7/2003 | Jiang et al. | |
| 6,606,156 B1 | 8/2003 | Ehbets et al. | |
| 6,614,528 B1 | 9/2003 | Bohle | |
| 6,630,999 B2 | 10/2003 | Shroder | |
| 6,643,011 B2 | 11/2003 | Kojima | |
| 6,646,739 B2 | 11/2003 | Kaneko | |
| 6,661,513 B1 | 12/2003 | Granger | |
| 6,678,044 B2 | 1/2004 | Kaneko | |
| 6,683,686 B2 | 1/2004 | Weigold | |
| 6,734,966 B2 | 5/2004 | McCarthy | |
| 6,741,349 B1 | 5/2004 | Sweatt et al. | |
| 6,744,505 B1 | 6/2004 | Wang et al. | |
| 6,744,506 B2 | 6/2004 | Kaneko et al. | |
| 6,785,002 B2 | 8/2004 | Zarrabian et al. | |
| 6,791,086 B2 | 9/2004 | Russell | |
| D498,736 S | 11/2004 | Lee | |
| 6,823,198 B2 | 11/2004 | Kobayashi | |
| D502,159 S | 2/2005 | Chan et al. | |
| 6,862,092 B1 | 3/2005 | Ibsen et al. | |
| 6,886,953 B2 | 5/2005 | Cook | |
| 6,906,798 B2 | 6/2005 | Kojima et al. | |
| 6,917,425 B2 | 7/2005 | Caruso et al. | |
| 6,922,240 B2 | 7/2005 | Lerner et al. | |

| | | |
|---|---|---|
| 6,954,271 B2 | 10/2005 | Curtiss |
| 6,977,727 B2 | 12/2005 | Lerner |
| 6,980,295 B2 | 12/2005 | Lerner |
| 6,985,226 B2 | 1/2006 | Lerner |
| 6,993,573 B2 | 1/2006 | Hunter |
| 7,003,318 B2 | 2/2006 | Kota et al. |
| 7,006,217 B2 | 2/2006 | Lerner |
| 7,009,702 B2 | 3/2006 | Caruso et al. |
| 7,016,037 B2 | 3/2006 | Chrisp et al. |
| 7,016,038 B2 | 3/2006 | Chrisp et al. |
| 7,019,833 B2 | 3/2006 | Harnisch |
| 7,034,935 B1 | 4/2006 | Kruzelecky |
| D520,976 S | 5/2006 | LaDelfa |
| 7,041,979 B2 | 5/2006 | Chrisp |
| 7,043,284 B2 | 5/2006 | Tornaghi |
| 7,061,611 B2 | 6/2006 | Mitchell |
| 7,075,082 B2 | 7/2006 | Tsao |
| 7,080,912 B2 | 7/2006 | Cook |
| 7,081,955 B2 | 7/2006 | Teichmann et al. |
| D526,983 S | 8/2006 | Gong et al. |
| 7,106,440 B2 | 9/2006 | Granger |
| 7,117,011 B2 | 10/2006 | Makino |
| 7,148,488 B2 | 12/2006 | Horton et al. |
| 7,158,228 B2 | 1/2007 | Psaltis et al. |
| 7,161,673 B2 | 1/2007 | Da Silva |
| 7,164,921 B2 | 1/2007 | Owens et al. |
| 7,170,600 B2 | 1/2007 | Nishii et al. |
| 7,180,590 B2 | 2/2007 | Batsue et al. |
| 7,199,876 B2 | 4/2007 | Mitchell |
| 7,199,877 B2 | 4/2007 | Kehoe et al. |
| 7,228,151 B2 | 6/2007 | Kota et al. |
| 7,233,394 B2 | 6/2007 | Odhner |
| 7,236,243 B2 | 6/2007 | Beecroft et al. |
| 7,239,386 B2 | 7/2007 | Chrisp et al. |
| 7,262,845 B2 | 8/2007 | Avrotsky |
| 7,289,208 B2 | 10/2007 | Vakhshoori et al. |
| 7,304,814 B2 | 12/2007 | Tsao |
| 7,330,258 B2 | 2/2008 | Warren |
| 2001/0048526 A1 | 12/2001 | Bender |
| 2002/0060792 A1 | 5/2002 | Ibsen et al. |
| 2004/0017567 A1 | 1/2004 | Loicht et al. |
| 2004/0057049 A1 | 3/2004 | Bruch et al. |
| 2005/0012927 A1 | 1/2005 | Seyfried et al. |
| 2005/0174573 A1 | 8/2005 | Harvey et al. |
| 2005/0175362 A1 | 8/2005 | Wilson |
| 2006/0082772 A1 | 4/2006 | Kehoe et al. |
| 2006/0139636 A1 | 6/2006 | Kerstan et al. |
| 2007/0019194 A1 | 1/2007 | Chen et al. |
| 2007/0030483 A1 | 2/2007 | Everett et al. |
| 2007/0152154 A1* | 7/2007 | DeCamp et al. ........ 250/339.07 |
| 2007/0171415 A1 | 7/2007 | Chrisp |
| 2007/0194239 A1 | 8/2007 | McAllister et al. |
| 2007/0211250 A1 | 9/2007 | Teichmann et al. |
| 2007/0236697 A1 | 10/2007 | Zribi et al. |
| 2007/0252989 A1 | 11/2007 | Comstock |
| 2008/0013086 A1 | 1/2008 | Deck |

FOREIGN PATENT DOCUMENTS

| | | |
|---|---|---|
| JP | 55-093030 A | 7/1980 |
| WO | WO 2004/023974 A2 | 3/2004 |
| WO | WO 2006/102640 A2 | 9/2006 |
| WO | WO 2006/127840 A2 | 11/2006 |

OTHER PUBLICATIONS

Optical Engineering, Jan./Feb. 1974, vol. 13, No. 1, pp. 25 et seq.
Ring, Bell Telephone Laboratories Incorporated, Mobile Telephony-Wide Area Coverage- Case 20564, Dec. 11, 1947, pp. 1-20.
Written Opinion issued in International Application No. PCT/US2008/083613 on Feb. 18, 2009.
International Search Report issued in International Application No. PCT/US2008/083613 on Feb. 18, 2009.

* cited by examiner

COMPACT SPECTROMETER

This application claims the benefit of U.S. Provisional Patent Application No. 60/997,983 filed in the U.S. Patent and Trademark Office on Oct. 5, 2007, the entire disclosure of which is hereby incorporated herein by reference in its entirety.

BACKGROUND

1. Field of the Invention

The embodiments relate to optical spectroscopy. In particular, the embodiments relate to spectrometers. More particularly, the embodiments relate to compact spectrometers designed to reduce and minimize their dimensions and volumes with optimized spectral performance characteristics based on the unilateralized optical technique described herein.

2. Description of Related Art

Instruments used for spectroscopic measurements and applications belong to one family that includes monochromators and spectrometers. A monochromator is an optical device that transmits a mechanically selectable narrow band of wavelengths of light chosen from a wider range of wavelengths available at the input. A spectrometer is an optical instrument for measuring and examining the spectral characteristics of the input light over some portion of the electromagnetic spectrum, where the measured variable is often the light intensity.

A monochromator may be differentiated from a spectrometer in at least two aspects: (1) a monochromator has an exit slit positioned at its spectral focal plane; while a spectrometer has no exit slit, but a linear detector array mounted at its spectral image plane; and (2) a monochromator has to be equipped with a scanning mechanism driving either a dispersive grating, or a focusing mirror, or the exit slit, in order to transmit the desired monochromatic light as the output through the exit slit; while a spectrometer has no moving parts and is capable of acquiring an instant full spectrum of the input light.

Nevertheless, the optical systems of such kinds of spectroscopic instruments, regardless of whether the instrument is classified as a monochromator or a spectrometer, are the same in working principle. Therefore, monochromators and spectrometers often are considered the same kind of instruments. Further, for the sake of simplicity throughout this disclosure, only a spectrometer will be referenced in this disclosure. A typical optical system of a spectrometer basically comprises an element(s) for collimating, an element(s) for dispersing and an element(s) for focusing to form spectral images. An entrance slit functions as the input interface, where an optional input optics exists. A detector converts optical signals to electronic signals. Such conventional optical technique makes a spectrometer cumbersome, i.e., complex in construction, large in body volume and heavy in weight. Further, there exist a few technical problems inherently associated with such spectroscopic instruments, particularly for a conventional spectrometer: astigmatism over the spectrum on the detector plane, and field curvature from the spectrum focused onto the detector plane, as reviewed by U.S. Pat. No. 5,880,834.

As a result, it has become a challenge to design and build a spectrometer to overcome the drawbacks and technical problems mentioned above, to which, substantial efforts have been directed and numerous improvements have been published for the purposes of simplifying optics, minimizing body volume, reducing weight, and eliminating optical aberrations, mainly astigmatism and field curvature. Among those areas of concerns, constructing compact spectrometers has generated manifold attention since the trend in modern spectrometer systems is toward a compact one and it has the potential to open up for wider applications in many industries, as shown in the following.

Representatives of the art can be categorized in accordance of their construction features associated with spectrometers: lens spectrometers, mirror spectrometers, spectrometers of simple construction, and compact spectrometers.

Representative of the art for lens spectrometers is U.S. Pat. No. 3,572,933 (1971) to Boostrom, which discloses a monochromator of classical configuration comprising a collimating lens, a transmission grating and a focusing lens to form spectra. U.S. Pat. No. 5,497,231 (1996) to Schmidt discloses another lens monochromator of scanning feature, which relies on a reflective planar grating. U.S. Pat. No. 6,122,051 (2000) to Ansley discloses another lens spectrometer of multi slits, which uses a prism as dispersion element. U.S. Pat. No. 7,180,590 (2007) to Bastue et al. discloses another lens spectrometer of transmission path, which is independent of temperature-induced wavelength drift.

Representative of the art for mirror spectrometers is U.S. Pat. No. 5,192,981 (1993) to Slutter et al., which discloses a monochromator of Czerny-Turner geometry comprising a collimating mirror, a reflective grating and a focusing mirror. This configuration is one of those typical of early prior art efforts and is a technique that is generally well known. The improvement of the disclosure comprises the use of a single toroidal collimating mirror in the system in combination with a spherical focusing mirror to minimized optical aberrations within final spectral images.

Another representative of the art for mirror spectrometers is U.S. Pat. No. 6,507,398 (2003) to Arai et al., which discloses a spectrometer of crossed Czerny-Turner geometry where the incident beam and the reflected beam from the diffraction grating cross. Cross Czerny-Turner configuration becomes one of preferred considerations for compact spectrometer designs.

Another representative of the art for mirror spectrometers is U.S. Pat. No. 4,310,244 (1982) to Perkins et al., which discloses a monochromator of Fastie-Ebert geometry comprising a big mirror for both collimating and focusing, plus a reflective planar grating. Fastie-Ebert configuration evolves from that of Czerny-Turner by combining the two mirrors into one. It becomes a preferred choice for a design of simple construction, as disclosed by U.S. Pat. No. 6,081,331 (2000) to Teichmann, which describes a spectrometer of Fastie-Ebert geometry formed in a cylinder body of glass. U.S. Pat. No. 7,239,386 (2007) to Chrisp et al. also discloses a design of imaging spectrometer of Fastie-Ebert configuration, which is improved by a glass-immersed mirror and a glass-immersed grating. This modification provides extra optical power to compensate optical aberrations.

Representative of the art for spectrometers of simple construction is U.S. Pat. No. 4,568,187 (1986) to Toshiaki et al., which discloses a spectrometer comprising a single concave grating. The concave grating is manufactured with curved grooves of varied spacing for optimum performance, and functions for both dispersing and imaging. It has become a known art that a concave grating sets the minimum number of optical elements needed in a spectrometer, leading to a simplest structure form.

Another representative of the art for spectrometers of simple construction is U.S. Pat. No. 5,182,609 (1993) to Kita et al., which discloses a spectrometer of Rowland configuration, comprising a single concave grating plus a second optical element introduced in the path for flattening spectral image formed at the focal plane.

Another representative of the art for spectrometers of simple construction is U.S. Pat. No. 5,233,405 (1993) to Wildnauer et al., which discloses a double-pass monochromator comprising a lens for both collimating and focusing, and a reflective planar grating for dispersing.

Another representative of the art for spectrometers of simple construction is U.S. Pat. No. 5,424,826 (1995) to Kinney, which discloses an optical micro-spectrometer system. This system consists of a group of micro-spectrometers, each of which comprises an input fiber, a lens for both collimating and focusing, and a reflective planar grating for dispersing.

Another representative of the art for spectrometers of simple construction is U.S. Pat. No. 5,812,262 (1998) to Ridyard et al., which discloses an apparatus of spectrometer type for UV radiation. Constructed by a single piece of waveguide carrier, it comprises a concave mirror and a reflective planar grating for focusing light from the entrance aperture means onto the radiation detector means. This configuration relies on a fixed order of the optical elements of focusing and then dispersing the light, which makes it difficult to compensate or avoid aberrations, in particular chromatic aberration.

Another representative of the art for spectrometers of simple construction is U.S. Pat. No. 6,597,452 (2003) to Jiang et al., which discloses a Littrow-type spectrometer, comprising a planar mirror, a concave mirror for both collimating and focusing, and a reflective planar grating, arranged within a compact configuration.

Representative of the art for compact spectrometers is U.S. Pat. No. 5,159,404 (1992) to Bittner, which discloses a compact spectrometer where the grating and the focusing mirror are combined on one side of a single transparent carrier, and the light entrance means and light detecting means are both placed on the other side of the spectrometer, making it possible to construct a compact spectrometer with a robust body.

Another representative of the art for compact spectrometers is U.S. Pat. No. 5,550,375 (1996) to Peters et al., which discloses a compact spectrometer designed as infrared spectrometric sensor. It comprises two parts: single-piece shaped base mirror plate manufactured as a microstructured body, having the concave cylindrical grating formed at one end, and the entrance port and detector slit at the other end, and a thin plate mirror as top cover. The integrated spectrometer has a thin layer (less than 1 mm) of reflective hollow cavity, which is filled with the gas to be monitored, through which infrared light propagate in divergence and convergence laterally, but guided vertically by the top and bottom mirror surfaces. This structure is only suitable for infrared peak absorption measurement of gas using a single cell detector of large area.

Another representative of the art for compact spectrometers is U.S. Pat. No. 6,606,156 (2003) to Ehbets, et al., which discloses a compact spectrometer comprising a concave grating, mounted on one side of the housing. The input port and the detector array are positioned opposite the concave grating, leaving a hollow cavity where the input optical beams propagate.

Another representative of the art for compact spectrometers is U.S. Pat. No. 7,081,955 (2006) to Teichmann et al., which discloses a compact spectrometer comprising two parts: the main body with grating and the focusing element being formed on the top of the housing, and the bottom substrate of detector array with light entrance means. The integrated spectrometer has a hollow cavity where the input optical beams propagate.

Another representative of the art for a compact spectrometer is U.S. Pat. No. 4,744,618 (1988) to Mahlein, which discloses a waveguide based device as multiplexer/demultiplexer, where light propagates based on total internal reflection through micro structures. Functioning like a compact spectrometer, it has a unilateral-type solid monolithic glass body of the Ebert-Fastie configuration, which makes it possible to build a compact device.

As stated above, conventional spectrometers are cumbersome and have large volumes, including those compact spectrometers of a single concave grating, which are either constructed from a single solid block of transparent material (e.g., glass), or integrated by mechanical mounting parts and housing. In contrast, waveguide based spectrometers typically allow for smaller volumes. The difference in volume between conventional spectrometers and waveguide based spectrometers may be attributed to the fact that the former is constructed with bulky optical elements and has a light propagation path that is three-dimensional, while the later (i.e., a waveguide based spectrometer) is constructed from a thin monolithic glass substrate in which a light propagation path exists in a thin layer (e.g., approximately 10 to 100 s micrometers) of glass media that are two-dimensional, or at least substantially unilateral. It seems that waveguide based technology may becomes a promising candidate for compact spectrometers.

However, from a practical perspective, the manufacturing process of waveguide products is expensive, and there are other technical issues associated with waveguide performance, including, but not limited to, high propagation loss, stray light caused by scattering at waveguide boundary, etc . . . Additionally, the coupling efficiency of waveguide devices is very susceptible to misalignment at input interfaces.

In general, existing spectrometers have not been an object of miniaturization as has been other technological machines and equipment because of the lack of technology in such field of endeavor. Thus, wider applications of spectrometers have not been possible for areas where miniaturization has become increasingly necessary or preferable. The embodiments of this disclosure overcome the above-identified disadvantages.

SUMMARY

A Cartesian coordinate system denoted by XYZO is to be referenced in the discussions to follow, where the optical system of a spectrometer resides and light propagates. The coordinate system has three axes: X, Y, Z and an origin O. Two important planes are defined here: XOZ represents the horizontal plane, or the sagittal plane; YOZ represents the vertical plane, or the tangential plane. Z represents the propagation direction of light. A beam of light is considered having a three-dimensional path, as the beam of light converges, diverges, or otherwise maintains a finite collimated size in both the tangential and sagittal planes as it propagates in Z direction. A beam of light is considered having a substantially two-dimensional (substantially unilateralized) path, if the beam of light converges, diverges, or otherwise maintains a finite collimated size in either the tangential or the sagittal planes, but is confined within a thin layer in or parallel to the other plane, as it propagates in Z direction.

The main object of the embodiments is to provide an optical technique that makes the propagation path, either in transparent media or in free space, of the optical beams emitting from a small input aperture/slit of a spectrometer, two-dimensional or substantially unilateralized with narrower path widths, thereby enabling physical sizes of any optical elements needed thereafter to construct a spectrometer to be significantly reduced in one dimension, and possibly in another dimension. Consequently, a significant reduction of instrument/device volume can be achieved together with optimized spectral performances, which is applicable to and beneficial to either a classical spectrometer or a compact spectrometer.

The above description broadly sets forth a summary of the present embodiments so that the following detailed description may be better understood and contributions of the present embodiments to the art may be better appreciated. Some of the embodiments may not include all of the features or characteristics listed in the above summary. There are, of course, additional features that will be described below. In this respect, before explaining any embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

In one aspect, it is an object of at least some embodiments to provide a means to manipulate the propagation properties of the optical beams separately in two independent directions, i.e., in the tangential plane and the sagittal plane, at any intersecting location(s) between optical beams and optical elements inside a spectrometer. This is accomplished by using optical elements, which have cylindrical cross-sections or toroidal surfaces with major optical powers in one direction (i.e., either in the tangential plane or in the sagittal plane) and minor or little optical powers in the orthogonal direction, in combination with other optional elements. The other optical elements include all types of cylindrical and toroidal lenses; all types of cylindrical and toroidal mirrors; one-dimensional, transmissive or reflective gratings of planar, concave or convex, cylindrical, toroidal or spherical substrates; herein "all types" represents properties of positive and negative optical power, spherical and aspherical shapes for cross-sections.

One aspect of at least some embodiments is to provide an entrance aperture of small size at the entrance slit position of spectrometers, where the entrance aperture can be the core of a single mode fiber, or the core of a multi-mode fiber, or pinholes of diameters similar to those of fibers' cores, or a slit of fiber core widths whose preferred height is less than a few millimeters. The optical outputs of the entrance aperture may have a symmetrical or asymmetrical cone shapes, whose propagation paths are three-dimensional.

Another aspect of at least some embodiments is to provide a collimating means to collimate the optical beams emitting from the entrance aperture in the tangential plane only, making the output beams of the collimating means anamorphic, which is substantially collimated in the tangential plane, but propagates in (slower) divergence in the sagittal plane. The collimating means can be a lens of orthogonal cylindrical cross-section or toroidal lens, or a concave mirror of orthogonal cylindrical cross-section or toroidal mirror, or a concave mirror of orthogonal conic cylindrical cross-sections or conic toroidal mirror, all of which have major optical power in the tangential plane, but have minor or little optical power in the sagittal plane. The collimating means is properly positioned behind the entrance aperture in the optical train of the spectrometer's optics, closely enough that its outputs of partially collimated anamorphic beams maintain a small and finite collimated size (e.g., no more than a few millimeters) in the tangential plane, whose propagation paths are two-dimensional with a possible narrow path width.

Another aspect of at least some embodiments is to provide a dispersing-focusing means, which resides at a certain distance behind the collimating means in the optical train of the spectrometer's optics. The dispersing-focusing means is capable of performing at least two tasks in the sagittal plane only: (1) dispersing the input optical beams received from the collimating means; and (2) forming spectral images of the entrance aperture onto a detector surface; plus optimizing spectral imaging quality in the tangential plane. Several examples of the dispersing-focusing means are explained below with respect to various embodiments. The outputs of the dispersing-focusing means remain partially collimated with a small and finite collimated size in the tangential plane, but are focused into spectral images at the detector surface in the sagittal plane. The outputs have propagation paths that are at least substantially two-dimensional.

Another aspect of at least some embodiments is to provide a focusing means to focus the optical beams received from the dispersing-focusing means onto the detector surface in the tangential plane only. The focusing means can be a cylindrical or toroidal lens, or a concave cylindrical or toroidal mirror, or a concave conic cylindrical or toroidal mirror, all of which may have major optical power in the tangential plane, but may have minor or little optical power in the sagittal plane. Thus, the outputs of the focusing means may form a linear spectral image at the detector surface with astigmatism and/or field curvature being minimized. The detector may be a linear array of detector pixels residing behind the focusing means, at the end of the optical train of the spectrometer's optics.

One embodiment is directed to a spectrometer comprising: (1) an entrance aperture; (2) a collimating means; (3)-(5) a dispersing-focusing means; (6) a focusing means; and (7) a detector. In such an embodiment, the dispersing-focusing means may be a transmission sub-system comprising: (3) a cylindrical/toroidal lens for collimating only in the sagittal plane; (4) a transmissive grating for dispersing only in the sagittal plane; and (5) a cylindrical/toroidal lens for focusing only in the sagittal plane. The (2) collimating means and the (6) focusing means respectively collimate and focus only in the tangential plane. The propagation paths within the spectrometer from (1) to (7) are substantially two-dimensional.

Another embodiment is directed to a spectrometer comprising (1) an entrance aperture; (2) a collimating means; (3)-(5) a dispersing-focusing means; (6) a focusing means; and (7) a detector. In such an embodiment, the dispersing-focusing means may be a catadioptric sub-system comprising: (3) a cylindrical/toroidal lens or mirror for collimating in the sagittal plane; (4) a reflective grating for dispersing in the sagittal plane; and (5) a cylindrical/toroidal mirror for focusing in the sagittal plane. The (2) collimating means and the (6) focusing means respectively collimate and focus only in the tangential plane. The propagation paths within the spectrometer from (1) to (7) are substantially two-dimensional.

Another embodiment is directed to a spectrometer comprising (1) an entrance aperture; (2) a collimating means; (3)-(5) a dispersing-focusing means; (6) a focusing means; and (7) a detector. In such an embodiment, the dispersing-focusing means may be a reflectance sub-system comprising: (3) a cylindrical/toroidal mirror for collimating in the sagittal plane; (4) a reflective grating for dispersing in the sagittal plane; and (5) a cylindrical/toroidal mirror for focusing in the sagittal plane. The (2) collimating means and the (6) focusing means respectively collimate and focus only in the tangential plane. The propagation paths within the spectrometer from (1) to (7) are substantially two-dimensional.

Another embodiment is directed to a spectrometer with Fastie-Ebert configuration comprising (1) an entrance aperture; (2) a collimating means; (3)-(4) a dispersing-focusing means; (5) a focusing means; and (6) a detector. In such an embodiment, the dispersing-focusing means may be a reflectance sub-system comprising: (3) a cylindrical/toroidal mirror for both collimating and focusing in the sagittal plane; and (4) a reflective grating for dispersing in the sagittal plane. The (2) collimating means and the (5) focusing means respectively collimate and focus only in the tangential plane. Optical means from (2) to (5) may be fabricated by a thin piece of monolithic transparent material. The propagation paths within the spectrometer from (1) to (6) are two-dimensional.

Another embodiment is directed to a spectrometer with Czerny-Turner configuration comprising (1) an entrance aperture; (2) a collimating means; (3)-(5) a dispersing-focusing means; (6) a focusing means; and (7) a detector. In such an embodiment, the dispersing-focusing means may be a reflectance sub-system comprising: (3) a cylindrical/toroidal mirror for collimating in the sagittal plane; (4) a reflective grating for dispersing in the sagittal plane; and (5) a cylindrical/toroidal mirror for focusing in the sagittal plane. The (2) collimating means and the (6) focusing means respectively collimate and focus only in the tangential plane. Optical means from (2) to (6) may be fabricated by a thin piece of monolithic transparent material. The propagation paths within the spectrometer from (1) to (7) are two-dimensional.

Another embodiment is directed to a spectrometer comprising (1) an entrance aperture; (2) a collimating means; (3)-(4) a dispersing-focusing means; (5) a focusing means; and (6) a detector. In such an embodiment, the dispersing-focusing means may be a hybrid sub-system comprising: (3) a cylindrical/toroidal lens for collimating and focusing in the sagittal plane; and (4) a reflective grating for dispersing in the sagittal plane. The (2) collimating means and the (5) focusing means respectively collimate and focus only in the tangential plane. The propagation paths within the spectrometer from (1) to (6) are two-dimensional.

Another embodiment is directed to a spectrometer comprising (1) an entrance aperture; (2) a collimating means; (3) a dispersing-focusing means; (4) a focusing means; and (5) a detector. In such an embodiment, the dispersing-focusing means is a concave cylindrical/toroidal reflective grating for dispersing and focusing in the sagittal plane. The (2) collimating means and the (4) focusing means respectively collimate and focus only in the tangential plane. Optical means from (2) to (4) can be fabricated by a thin piece of monolithic transparent material. The propagation paths within the spectrometer from (1) to (5) are two-dimensional.

One aspect of the embodiments is directed to building a spectrometer based on one of above embodiments or their modified configurations, in which the collimating means and the focusing means fulfill tasks of (1) generating images of the entrance aperture onto the detector surface in the tangential plane; (2) making the propagation paths of optical beams within the spectrometer two-dimensional; (3) making the propagation paths of optical beams after the collimating means laterally narrower; and (4) optimizing spectral imaging quality. Meanwhile, the dispersing-focusing means of the spectrometer performs at least the following functions: (i) dispersing the received optical beams into spectra in the sagittal plane; (ii) generating spectral images of the entrance aperture onto the detector surface in the sagittal plane; and (iii) optimizing spectral imaging quality. In this regard, significant improvements may be achieved in at least the following aspects: (a) sizes and dimensions of all optical elements used inside the spectrometer are significantly reduced in the Y direction, (i.e., in the vertical plane or the tangential plane), thereby significantly reducing the instrument/device volume; (b) possible/appreciable reduction of instrument/device volume in the X direction (i. e., in the horizon plane or the sagittal plane); and (c) optical aberration of astigmatism and curvature of spectral images are well compensated.

The above summary is not intended to describe each illustrated embodiment or every implementation of the present invention. The following figures and the detailed description more particularly exemplify embodiments.

BRIEF DESCRIPTION OF THE DRAWINGS

FIG. 3(c) illustrates the same type of spectrometer built by a piece of monolithic transparent carrier body further incorporating features of an embodiment of the invention;

DETAILED DESCRIPTION OF EMBODIMENTS

Figure 1:
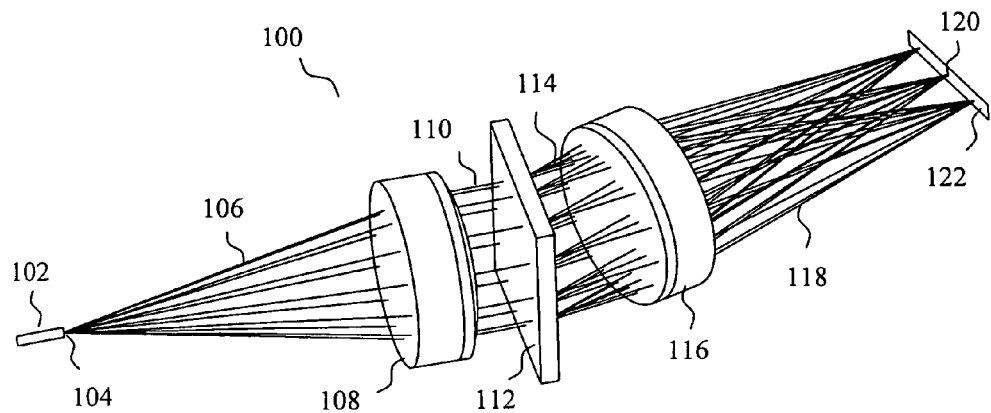
FIG. 1(a) is a perspective view of a prior art lens spectrometer comprising a collimating lens, a transmissive grating and a focusing lens.
FIG. 1(b) illustrates the same type of spectrometer as in FIG. 1(a), but incorporating features of an embodiment of the invention.
Figure 1:
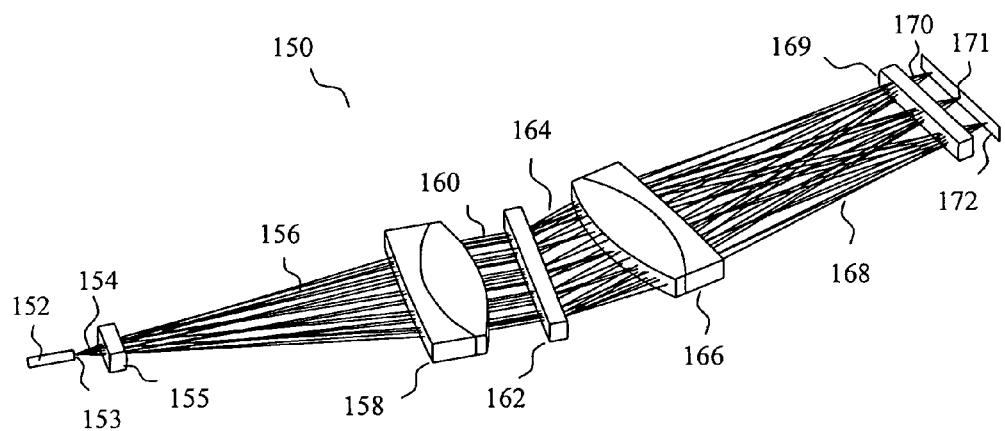

Referring now to the drawings, to the following detailed description, and to the incorporated materials, detailed information about aspects of the invention is provided including the description of specific embodiments. The detailed description serves to explain principles of the invention. The embodiments may be susceptible to modifications and alternative forms. Embodiments are not limited to the particular forms disclosed. Rather, the embodiments cover all modifications, equivalents, and alternatives falling within the spirit and scope of the invention.

Referring to FIG. 1(a), a prior art lens spectrometer 100 is illustrated in ray-trace form. The optics of spectrometer 100 comprises an entrance aperture 104 that is the core of the optical fiber 102 for input signal delivery, a collimating lens 108, a transmissive diffraction grating 112 and a focusing lens 116. For the spectrometer 100, the input light 106 emits from the entrance aperture 104 and propagates in divergence towards the collimating lens 108, which collimates the divergent light 106 into the collimated light 110. The collimated light 110 propagates and is incident upon the grating 112, which disperses the light 110 into the dispersive collimated light 114. The focusing lens 116 subsequently focuses the light 114 into the convergent light 118 thereby forming spectral images 120 on the detector 122. As shown in FIG. 1(a), the propagation paths for the divergent light 106, the collimated light 110, the dispersive light 114, and the convergent light 118 are all three-dimensional. The three key optical elements within the spectrometer 100, i.e., the collimating lens 108, the grating 112 and the focusing lens 116, must have finite working apertures large enough to accept and to manipulate the light 106, 110, 114 and 118 without truncating them at any locations. Consequently, the overall dimensional volume necessary to construct the spectrometer 100 is three-dimensional. Such a spectrometer is generally large and very difficult to be reduced without sacrificing its performance characteristics.

In FIG. 1(b), one embodiment of the same type of lens spectrometer 150 is illustrated in ray-trace form. The FIG. 1(b) embodiment incorporates aspects of the invention. The optics of spectrometer 150 comprises an entrance aperture 153 that is the core of the optical fiber 152 for input signal delivery (e.g., the input "signal" is white light), a first lens 155, a second lens 158, a transmissive diffraction grating 162, a third lens 166 and a fourth lens 169. For the spectrometer 150, the input light 154 emits from the entrance aperture 153 and propagates in divergence over a very short distance, then is intercepted by the first lens 155, which collimates the divergent light 154 only in the tangential plane (only in the YOZ plane), converting it into a partially collimated light, i.e., the anamorphic light 156, which is collimated in the tangential plane, but remains slower divergent in the sagittal (XOZ plane). The light 156 propagates and is transmitted through the second lens 158, which collimates it only in the sagittal plane, converting it into the fully collimated light 160. The light 160 continues to propagate and is incident upon the grating 162, which disperses the light 160 into dispersive collimated light 164. Upon being transmitted through the third lens 166, the light 164 is partially focused in the sagittal plane into the light 168, which is further partially focused by the fourth lens 169 in the tangential plane into the fully convergent light 170 to form spectral images 171 on the detector 172. As shown in FIG. 1(b), the propagation paths for the anamorphic light 156, collimated light 160, dispersive light 164, and the anamorphic light 168 are all substantially two-dimensional. The five key optical elements within the spectrometer 150, i.e., the first lens 155, the second lens 158, the grating 162, the third lens 166 and the fourth lens 169, which are properly chosen in combination in forms of toroidal, cylindrical and planar elements, have finite working aperture dimensions large enough only in the sagittal direction (i.e., horizontal), but otherwise very small aperture dimensions in the tangential direction (i.e., vertical). That is, the spectrometer requires only dimensions sufficient to accept and to manipulate light (i.e., 154, 156, 160, 164, 168 and 170) without truncating the light (i.e., 154, 156, 160, 164, 168 and 170) at any locations. In practice, the tangential dimensions (i.e., vertical) of those key optical elements needed may become small fractions of their original values in the prior art for similar types of devices, for example, around ⅕~ 1/10 (i.e., an approximate reduction in size of 80% to 90% may be achieved) or even better. Thus, the overall dimensional volume necessitated to construct the spectrometer 150 is substantially two-dimensional, or substantially unilateral, which is significantly reduced compared with that of its similar type of prior art spectrometer. Additionally, such a reduction in size is achieved with the spectrometer performance characteristics being optimized.

Figure 2:
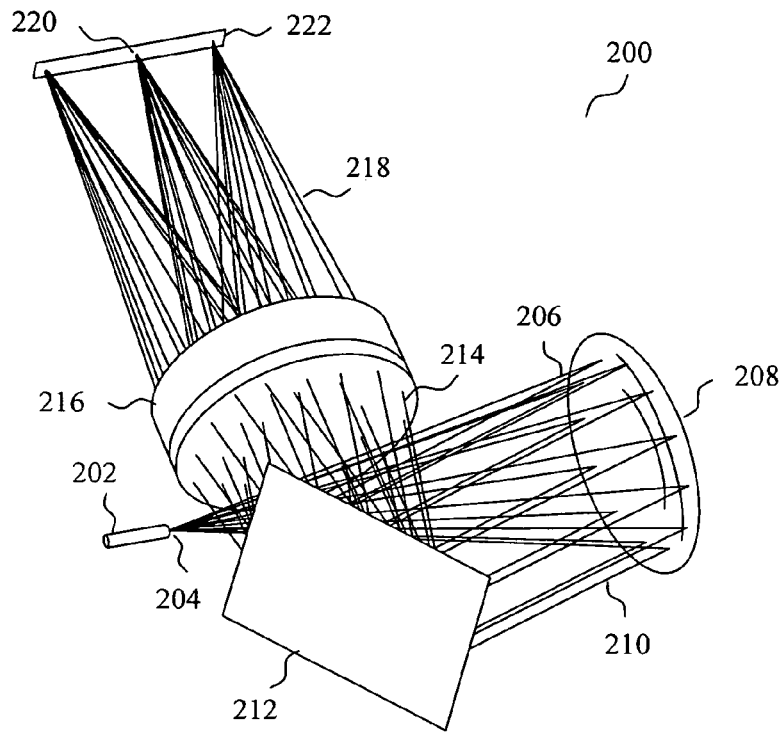
FIG. 2(a) is a perspective view of a prior art catadioptric spectrometer comprising a collimating mirror, a reflective grating and a focusing lens.
FIG. 2(b) illustrates the same type spectrometer as in FIG. 2(a), but incorporating features of an embodiment of the invention.
Figure 2:
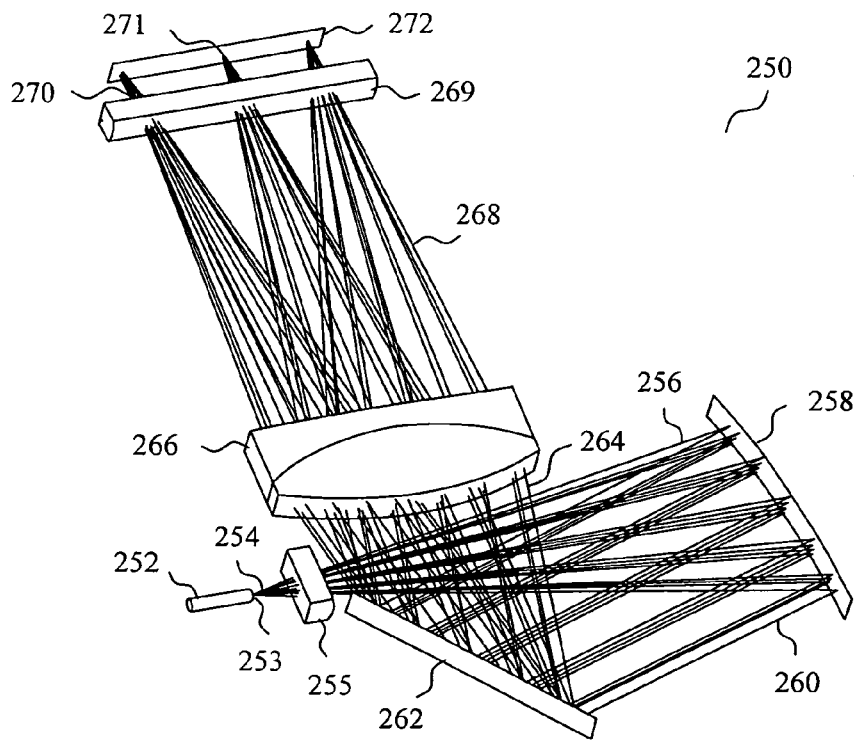

Next, referring to FIG. 2(a), a prior art catadioptric spectrometer 200 is illustrated in ray-trace form. The optics of spectrometer 200 comprises an entrance aperture 204 that is the core of the optical fiber 202 for input signal delivery, a collimating mirror 208, a reflective diffraction grating 212 and a focusing lens 216. For the spectrometer 200, the input light 206 emits from the entrance aperture 204 and propagates in divergence towards the collimating mirror 208, which collimates the divergent light 206 into the collimated light 210. The collimated light 210 propagates and is incident upon the grating 212, which disperses, in a reflective manner, the light 210 into the dispersive collimated light 214. Thereafter, the focusing lens 216 focuses the light 214 into the convergent light 218 to form spectral images 220 on the detector 222. As shown in FIG. 2(a), the propagation paths for the divergent light 206, the collimated light 210, the dispersive light 214, and the convergent light 218 are all three-dimensional. The three key optical elements within the spectrometer 200, (i.e., the collimating mirror 208, the grating 212 and the focusing lens 216), must have finite working apertures large enough to accept and manipulate the light (i.e., 206, 210, 214 and 218) without truncating such light at any location. Generally, the overall dimensional volume necessitated to construct the spectrometer 200 is three-dimensional. Such an overall dimensional volume is generally large and very difficult to be reduced without sacrificing its performance characteristics.

In FIG. 2(b), a catadioptric spectrometer 250 incorporating features of one embodiment of the invention is illustrated in ray-trace form. Such a catadioptric spectrometer 250 is of the same type of spectrometer 200 illustrated in FIG. 2(a). The optics of spectrometer 250 comprises an entrance aperture 253 that is the core of the optical fiber 252 for input signal delivery, a first lens 255, a mirror 258, a reflective diffraction grating 262, a second lens 266 and a third lens 269. For the spectrometer 250, the input light 254 emits from the entrance aperture 253 and propagates in divergence over a very short distance, then is transmitted through the first lens 255, which collimates the divergent light 254 only in the tangential plane, thereby converting such light into a partially collimated light, (i.e., the anamorphic light 256), which is collimated in the tangential plane, but remains slower divergent in the sagittal plane. The light 256 propagates and is reflected by the mirror 258, which collimates it only in the sagittal plane, converting it into the fully collimated light 260. The light 260 continues to propagate and is incident upon the grating 262, which disperses, in a reflective manner, the light 260 into dispersive collimated light 264. Upon being intercepted by the second lens 266, the light 264 is partially focused in the sagittal plane into the light 268, which is further partially focused by the third lens 269 in the tangential plane into the fully convergent light 270 to form spectral images 271 on the detector 272. As shown in FIG. 2(b), the propagation paths for the anamorphic light 256, the collimated light 260, the dispersive light 264, and the anamorphic light 268 are all substantially two-dimensional. The five key optical elements within the spectrometer 250, i.e., the first lens 255, the mirror 258, the grating 262, the second lens 266 and the third lens 269, which are properly chosen in combination in forms of toroidal, cylindrical and planar elements, have finite working aperture dimensions large enough only in the sagittal direction (i.e., horizontal), but very small aperture dimensions in the tangential direction (i.e., vertical), in order to accept and manipulate light 254, 256, 260, 264, and 270 without truncating them at any locations. In practice, the tangential dimensions (i.e., vertical) of those key optical elements may become a small fraction of those dimensions in the same type of prior art spectrometer, for example, around $1/5$~$1/10$ (i.e., an approximate reduction in size of 80% to 90% may be achieved) or even better. Consequently, the overall dimensional volume necessitated to construct the spectrometer 250 is substantially two-dimensional, or unilateral, which is significantly reduced compared with that of its prior art spectrometer with its performance characteristics being optimized.

Figure 3:
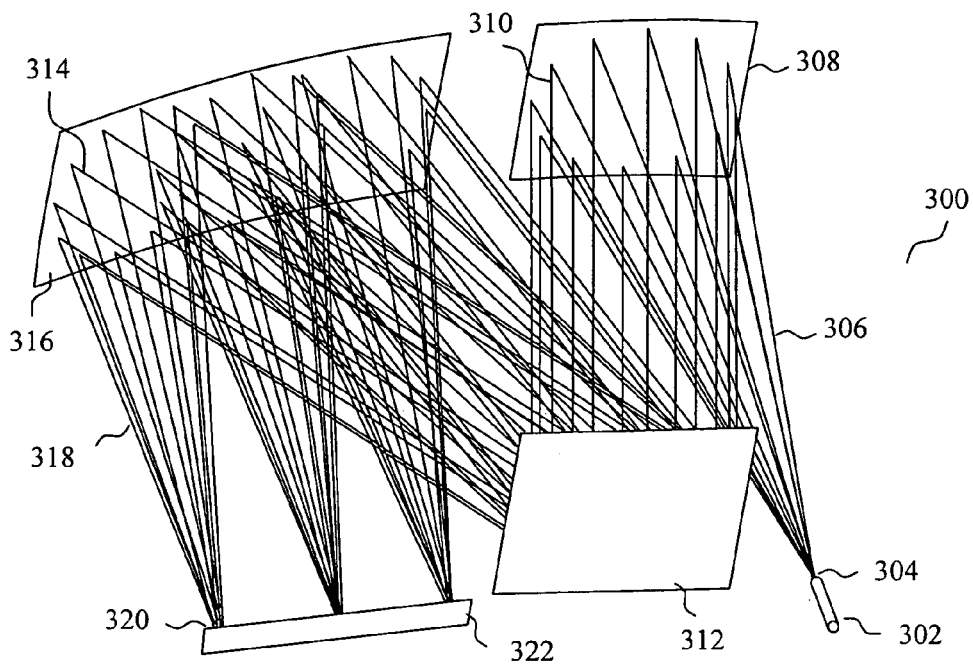
FIG. 3(a) is a perspective view of a prior art mirror spectrometer of Czerny-Turner configuration.
FIGS. 3(c), (d) and (e) illustrates three of the same type of spectrometers of FIG. 3(a), but incorporating features of four various embodiments of the invention, specifically
Figure 3:
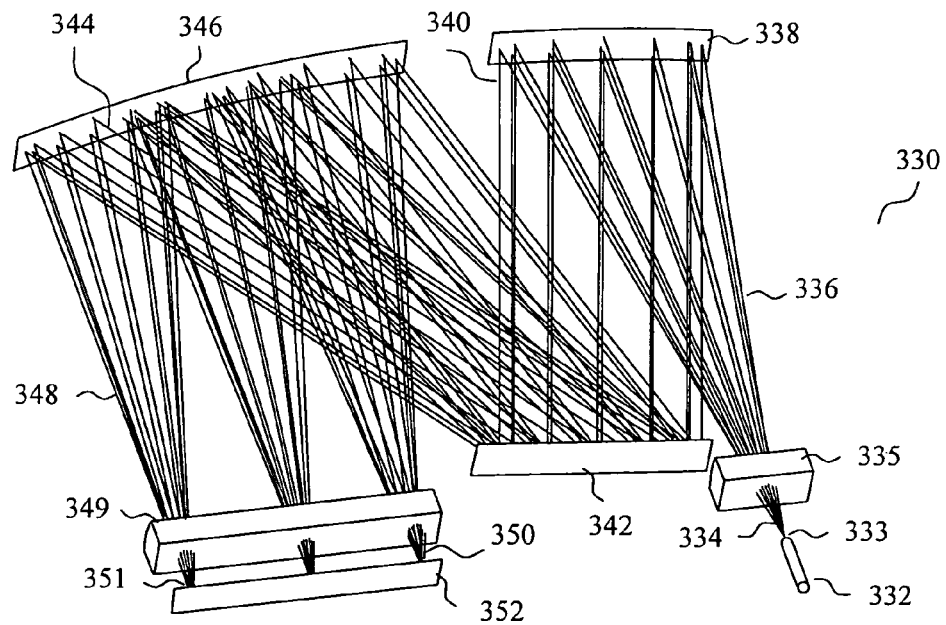

Next, referring to FIG. 3(a), a prior art mirror spectrometer 300 of Czerny-Turner geometry is illustrated in ray-trace form. Its optics comprises an entrance aperture 304 that is the core of the optical fiber 302 for input signal delivery, a collimating mirror 308, a reflective diffraction grating 312 and a focusing mirror 316. For the spectrometer 300, the input light 306 emits from the entrance aperture 304 and propagates in divergence toward the collimating mirror 308, which collimates the divergent light 306 into the collimated light 310. The collimated light 310 propagates and is incident upon the grating 312, which disperses, in a reflective manner, the light 310 into the dispersive collimated light 314, and then the focusing mirror 316 focuses the light 314 into the convergent light 318 to form spectral images 320 on the detector 322. As shown in FIG. 3(a), the propagation paths for the divergent light 306, the collimated light 310, the dispersive light 314, and the convergent light 318 are all three-dimensional. The three key optical elements within the spectrometer 300, i.e., the collimating mirror 308, the grating 312 and the focusing mirror 316, must have finite working apertures large enough to accept and to manipulate the light 306, 310, 314 and 318 without truncating such light at any locations. As a result, the overall dimensional volume necessitated to construct the spectrometer 300 is three-dimensional. Such an overall dimensional volume is generally large and very difficult to be reduced without sacrificing its performance characteristics.

In FIG. 3(b), a mirror spectrometer 330 of Czerny-Turner geometry incorporating features of one embodiment of the invention is shown in ray-trace form. The mirror spectrometer 330 is the same type of mirror spectrometer of Czerny-Turner geometry as that shown in FIG. 3(a). The optics of mirror spectrometer 330 comprises an entrance aperture 333 that is the core of the optical fiber 332 for input signal delivery, a first lens 335, a first mirror 338, a reflective diffraction grating 342, a second mirror 346 and a second lens 349. For the spectrometer 330, the input light 334 emits from the entrance aperture 333 and propagates in divergence over a very short distance, then is transmitted through the first lens 335, which collimates the divergent light 334 only in the tangential plane, converting it into a partially collimated light, i.e., the anamorphic light 336, which is collimated in the tangential plane, but remains slower divergent in the sagittal plane. The light 336 propagates and is reflected by the first mirror 338, which collimates it only in the sagittal plane, converting it into the fully collimated light 340. The light 340 continues to propagate and is incident upon the grating 342, which disperses, in a reflective manner, the light 340 into dispersive collimated light 344. Upon being reflected by the second mirror 346, the light 344 is partially focused in the sagittal plane into the light 348, which is further partially focused by the second lens 349 in the tangential plane into the fully convergent light 350 to form spectral images 351 on the detector 352. As shown in FIG. 3(b), the propagation paths for the anamorphic light 336, the collimated light 340, the dispersive light 344, and the anamorphic light 348 are all substantially two-dimensional. The five key optical elements within the spectrometer 330, i.e., the first lens 335, the first mirror 338, the grating 342, the second mirror 346 and the second lens 349, which are properly chosen in combination in forms of toroidal, cylindrical and planar elements, must have finite working aperture dimensions large enough only in the sagittal direction (i.e., horizontal), but very small aperture dimensions are needed in the tangential direction (i.e., vertical), in order to accept and to manipulate light 334, 336, 340, 344, 348 and 350 without truncating such light at any locations. In practice, the tangential dimensions (i.e., vertical) of those key optical elements needed may become small fractions of their original values in the same prior art, for example, around $1/5$~$1/10$ (i.e., an approximate reduction in size of 80% to 90% may be achieved) or even better. Thus, the overall dimensional volume necessitated to construct the spectrometer 330 is substantially two-dimensional, or substantially unilateral, which is significantly reduced compared with that of its prior art spectrometer. Additionally, such a reduction in size is achieved with its performance characteristics being optimized.

In FIG. 3(c), a mirror spectrometer 360 of Czerny-Turner geometry incorporating features of one embodiment of the invention is illustrated in ray-trace form. Such a mirror spectrometer is of the same type as those shown in FIGS. 3(a) and (b). The spectrometer 360 is constructed by combining the five key optical elements in the spectrometer 330 together with a single piece of monolithic transparent carrier. The optics of spectrometer 360 comprises an entrance aperture 363 that is the core of the optical fiber 362 for input signal delivery, a first surface 365, a first mirror 367, a reflective diffraction grating 370, a second mirror 373 and a second surface 376. For the spectrometer 360, the input light 364 emits from the entrance aperture 363 and propagates in divergence over a very short distance, then is transmitted through the first surface 365, which collimates the divergent light 364 only in the tangential plane, converting it into a partially collimated light, i.e., the anamorphic light 366, which is collimated in the tangential plane, but remains slower divergent in the sagittal plane. The light 366 propagates and is reflected by the first mirror 367, which collimates it only in the sagittal plane, converting it into the fully collimated light 368. The light 368 continues to propagate and is incident upon the grating 370, which disperses, in a reflective manner, the light 368 into the dispersive collimated light 372. Upon being reflected by the second mirror 373, the light 372 is partially focused in the sagittal plane into the light 374, which is further partially focused by the second surface 376 in the tangential plane into the fully convergent light 377 to form spectral images 378 on the detector 379. As shown in FIG. 3(c), the propagation paths for the anamorphic light 366, the collimated light 368, the dispersive light 372, and the anamorphic light 374 are all substantially two-dimensional. The five key optical surfaces within the spectrometer 360, i.e., the first surface 365, the first mirror 367, the grating 370, the second mirror 373 and the second surface 376, which are properly chosen in combination in forms of toroidal, cylindrical and planar surface, must have finite working aperture dimensions large enough only in the sagittal direction (i.e., horizontal), but very small aperture dimensions needed in the tangential direction (i.e., vertical), in order to accept and to manipulate light 364, 366, 368, 372, 374 and 377 without truncating such light at any locations. In practice, the tangential dimensions (i.e., vertical) of those key optical surfaces needed may become small fractions of their original values in the same prior art, for example, around $\frac{1}{5}$~$\frac{1}{10}$ (i.e., an approximate reduction in size of 80% to 90% may be achieved) or even better. Thus, the overall dimensional volume necessitated to construct the spectrometer 360 is substantially two-dimensional, or substantially unilateral, which is significantly reduced compared with that of its prior art spectrometer. Additionally, such a reduction in size is achieved with its performance characteristics being optimized. Thus it is possible, based on the embodiment, to construct a spectrometer fabricated with a single piece of thin transparent carrier, which is robust and of very compact volume.

In FIG. 3(d), a mirror spectrometer 390 incorporating the features of another embodiment of the invention is illustrated. Such a mirror spectrometer is of the same type of mirror spectrometer shown in FIGS. 3(a) and (b) in ray-trace form. The spectrometer 390 may be modified from the spectrometer 330 shown in FIG. 3(b) by combining the two reflective mirrors into one mirror vertically and properly positioning the reflective grating. As a result, the overall optical paths within the spectrometer 390 have been folded three times by the single concave cylindrical mirror and the reflective grating, leading to a small instrument volume, which is very compact compared to that of the prior art spectrometer 300 shown in FIG. 3(a). Such a reduction in instrument volume is achieved with its performance characteristics being optimized.

In FIG. 3(e), a mirror spectrometer 330' incorporating the features of another embodiment of the invention is illustrated in ray-trace form. Actually, the spectrometer 330' is a counterpart of the spectrometer 330 shown in FIG. 3(b), where each marking number with a prime (') in FIG. 3(e) stands for the same entity of the same corresponding number in FIG. 3(b). The only difference is that the cylindrical/toroidal lens 335' has an increased minor optical power in the horizontal direction than that of 335 in FIG. 3(b), which has mild/small optical power in the horizontal direction, resulting in even slower divergence for its output beam 336' in the horizontal direction. As a result, the required dimensions for mirror 338', grating 342' and mirror 346' in the horizontal direction are noticeably reduced as well, leading to an instrument volume reduction achieved not only in the vertical direction but also in the horizontal direction, which is even more compact compared to that of the prior art spectrometer 300 shown in FIGS. 3(a), and 330 shown in FIG. 3(b). Such a reduction in instrument volume is achieved with its performance characteristics being optimized.

Figure 4:
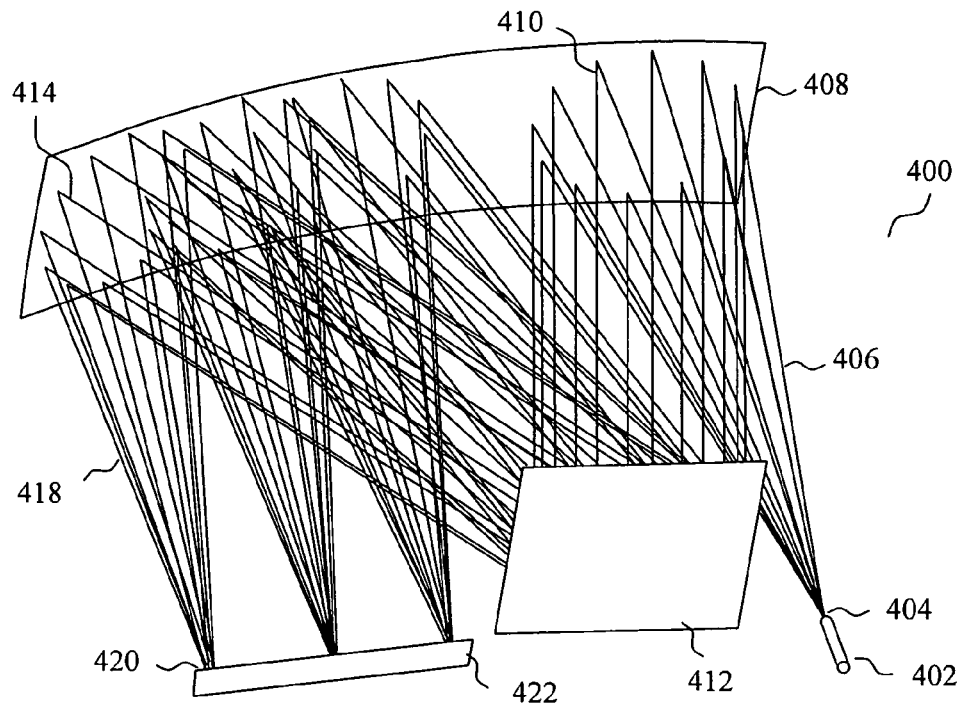
FIG. 4(a) is a perspective view of a prior art mirror spectrometer of Fastie-Ebert configuration.
FIGS. 4(b), (c) and (d) illustrate three of the same type of spectrometer as in FIG. 4(a), but incorporating features of various embodiments of the invention, specifically.
FIG. 4(c) shows the same type of spectrometer built by a piece of monolithic transparent carrier body further incorporating features of an embodiment of the invention.
Figure 4:
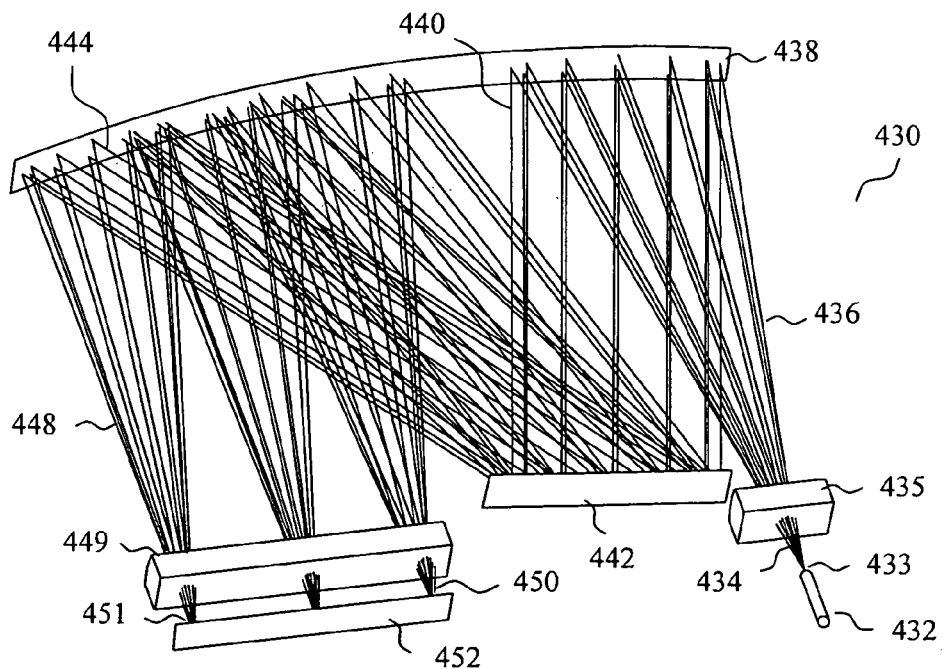

FIG. 4(a) represents another prior art mirror spectrometer 400, but of Fastie-Ebert geometry, which is very similar to that of Czerny-Turner geometry shown in FIG. 3(a). A Fastie-Ebert spectrometer may be constructed from a Czerny-Turner spectrometer by properly combining the two concave mirrors together into one big concave mirror, which functions for both collimating and focusing. Apart from this structural difference, the respective working principles are the same. FIG. 4(b) shows a mirror spectrometer 430 incorporating features of one embodiment of the invention. Such an embodiment is of the same type of spectrometer shown in 400, and is a counterpart of FIG. 3(b). In other words, both spectrometers work in the same way. Thus, the overall dimensional volume necessitated to construct the spectrometer 430 in FIG. 4(b) is substantially two-dimensional, or substantially unilateral, which is significantly reduced compared with that of its prior art spectrometer. Additionally, such a reduction in overall dimensional volume is achieved with its performance characteristics being optimized. FIG. 4(c) shows another embodiment of the type of spectrometer shown in FIG. 4(a) to which aspects of the invention have been applied. Such a spectrometer 460 is a counterpart of spectrometer 360 shown in FIG. 3(c), and they both work in the same way. The spectrometer 460 in FIG. 4(c) may be fabricated with a single piece of thin transparent carrier, which is robust and of very compact volume.

In FIG. 4(d), a mirror spectrometer 430' incorporating the features of another embodiment of the invention is illustrated in ray-trace form. Actually, the spectrometer 430' is a counterpart of the spectrometer 430 shown in FIG. 4(b), where each marking number with a prime (') in FIG. 4(d) stands for the same entity of the same corresponding number in FIG. 4(b). The only difference is that the cylindrical/toroidal lens 435' has an increased minor optical power in the horizontal direction than that of 435 in FIG. 4(b), which has mild/small optical power in the horizontal direction, resulting in even slower divergence for its output beam 436' in the horizontal direction. As a result, the required dimensions for both mirror 438' and grating 442' in the horizontal direction are noticeably reduced as well, leading to an instrument volume reduction achieved not only in the vertical direction but also in the horizontal direction, which is even more compact compared to that of the prior art spectrometer 400 shown in FIGS. 4(a), and 430 shown in FIG. 4(b). Such a reduction in instrument volume is achieved with its performance characteristics being optimized.

Figure 5:
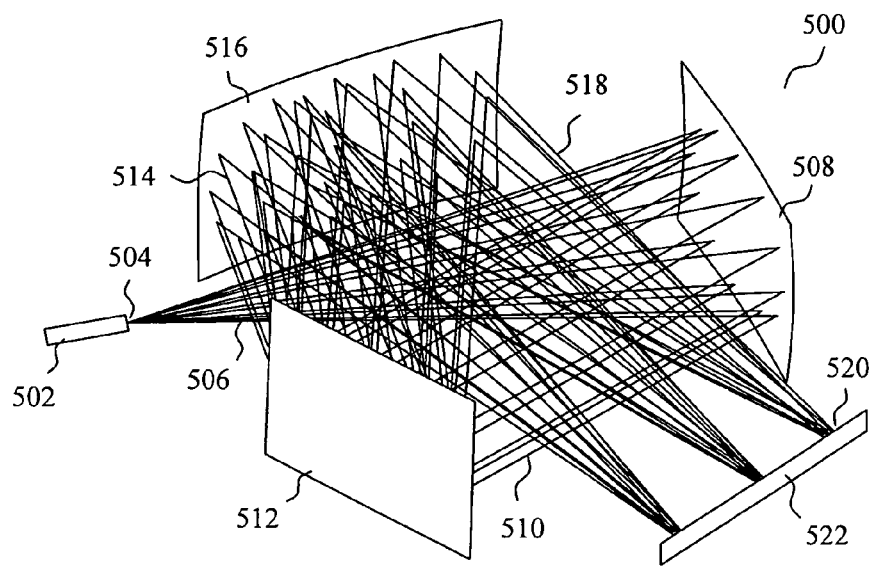
FIG. 5(a) is a perspective view of a prior art mirror spectrometer of crossed Czerny-Turner configuration.
FIGS. 5(b) and (c) illustrate two of the same type of spectrometer as in FIG. 5(a), but incorporating features of various embodiments of the invention, specifically.
FIG. 5(c) shows the same type of spectrometer built by a piece of monolithic transparent carrier body further incorporating features of an embodiment of the invention.
Figure 5:
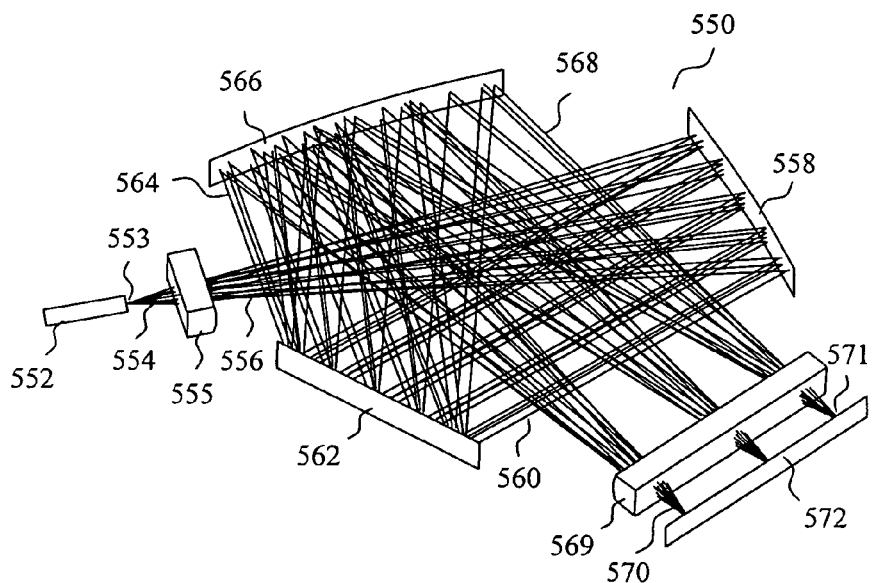

Next, referring to FIG. 5(a), another prior art mirror spectrometer 500 of crossed Czerny-Turner geometry is illustrated in ray-trace form. The spectrometer 500 is modified from the spectrometer 300 in FIG. 3(a), with respect to where the incident beam and the reflected beam from the diffraction grating cross. The optics of such a spectrometer 500 comprises an entrance aperture 504 that may be the core of the optical fiber 502 for input signal delivery, a collimating mirror 508, a reflective diffraction grating 512 and a focusing mirror 516. For the spectrometer 500, the input light 506 emits from the entrance aperture 504 and propagates in divergence toward the collimating mirror 508, which collimates the divergent light 506 into the collimated light 510. The collimated light 510 propagates and thereafter may be incident upon the grating 512, which disperses, in a reflective manner, the light 510 into the dispersive collimated light 514, and then the focusing mirror 516 focuses the light 514 into the convergent light 518 to form spectral images 520 on the detector 522. As shown in FIG. 5(a), the propagation paths for the divergent light 506, the collimated light 510, the dispersive light 514, and the convergent light 518 are all three-dimensional. The three key optical elements within the spectrometer 500, i.e., the collimating mirror 508, the grating 512 and the focusing mirror 516, must have finite working apertures large enough to accept and to manipulate the light 506, 510, 514 and 518 without truncating such light at any locations. Consequently, the overall dimensional volume necessitated to construct the spectrometer 500 is three-dimensional. Such an overall dimensional volume is generally large and very difficult to be reduced without sacrificing its performance characteristics.

FIG. 5(b) shows a mirror spectrometer 550 of crossed Czerny-Turner geometry incorporating the features of an embodiment of the invention. Such a mirror spectrometer 550 is of the same type of spectrometer as that shown in FIG. 5(a). The optics of spectrometer 550 comprises an entrance aperture 553 that may be the core of the optical fiber 552 for input signal delivery, a first lens 555, a first mirror 558, a reflective diffraction grating 562, a second mirror 566 and a second lens 569. For the spectrometer 550, the input light 554 emits from the entrance aperture 553 and propagates in divergence over a very short distance, then is transmitted through the first lens 555, which collimates the divergent light 554 only in the tangential plane, converting it into a partially collimated light, i.e., the anamorphic light 556, which is collimated in the tangential plane, but remains slower divergent in the sagittal plane. The light 556 propagates and is reflected by the first mirror 558, which collimates it only in the sagittal plane, converting it into the fully collimated light 560. The light 560 continues to propagate and is incident upon the grating 562, which disperses, in a reflective manner, the light 560 into dispersive collimated light 564. Upon being reflected by the second mirror 566, the light 564 is partially focused in the sagittal plane into the light 568, which is further partially focused by the second lens 569 in the tangential plane into the fully convergent light 570 to form spectral images 571 on the detector 572. As shown in FIG. 5(b), the propagation paths for the anamorphic light 556, the collimated light 560, the dispersive light 564, and the anamorphic light 568 are all substantially two-dimensional. The five key optical elements within the spectrometer 550, i.e., the first lens 555, the first mirror 558, the grating 562, the second mirror 566 and the second lens 569, which are properly chosen in combination in forms of toroidal, cylindrical and planar elements, must have finite working aperture dimensions large enough only in the sagittal direction (i.e., horizontal), but very small aperture dimensions needed in the tangential direction (i.e., vertical), in order to accept and to manipulate light 554, 556, 560, 564, 568 and 570 without truncating such light at any locations. In practice, the tangential dimensions (i.e., vertical) of those key optical elements needed become small fractions of their original values in the same prior art, for example, around ⅕~ 1/10 (i.e., an approximate reduction in size of 80% to 90% may be achieved) or even better. Thus, the overall dimensional volume necessitated to construct the spectrometer 550 is substantially two-dimensional, or substantially unilateral, which is significantly reduced compared with that of its prior art spectrometer. Additionally, such a reduction in overall dimensional volume is achieved with its performance characteristics being optimized.

FIG. 5(c) shows, in ray-trace form, a mirror spectrometer 580 of crossed Czerny-Turner geometry incorporating features of an embodiment of the invention. Such a mirror spectrometer is of the same type of spectrometer as those shown in FIG. 5(a) and (b). The spectrometer 580 may be constructed by combining the five key optical elements in the spectrometer 550 together with a single piece of monolithic transparent carrier. The optics of such a spectrometer comprises an entrance aperture 583 that is the core of the optical fiber 582 for input signal delivery, a first surface 586, a first mirror 588, a reflective diffraction grating 591, a second mirror 594 and a second surface 596. For the spectrometer 580, the input light 584 emits from the entrance aperture 583 and propagates in divergence over a very short distance, then may be transmitted through the first surface 586, which collimates the divergent light 584 only in the tangential plane, converting it into a partially collimated light, i.e., the anamorphic light 587, which is collimated in the tangential plane, but remains slower divergent in the sagittal plane. The light 587 propagates and is reflected by the first mirror 588, which collimates it only in the sagittal plane, converting it into the fully collimated light 590. The light 590 continues to propagate and is incident upon the grating 591, which disperses, in a reflective manner, the light 590 into the dispersive collimated light 592. Upon being reflected by the second mirror 594, the light 592 may be partially focused in the sagittal plane into the light 595, which is further partially focused by the second surface 596 in the tangential plane into the fully convergent light 597 to form spectral images 598 on the detector 599. As shown in FIG. 5(c), the propagation paths for the anamorphic light 587, the collimated light 590, the dispersive light 592, and the anamorphic light 595 are all substantially two-dimensional. The five key optical surfaces within the spectrometer 580, i.e., the first surface 586, the first mirror 588, the grating 591, the second mirror 594 and the second surface 596, which are properly chosen in combination in forms of toroidal, cylindrical and planar surface, must have finite working aperture dimensions large enough only in the sagittal direction (i.e., horizontal), but very small aperture dimensions needed in the tangential direction (i.e., vertical) in order to accept and to manipulate light 584, 587, 590, 592, 595 and 597 without truncating such light at any locations. In practice, the tangential dimensions (i.e., vertical) of those key optical surfaces needed become small fractions of their original values in the same prior art, for example, around ⅕~ 1/10 (i.e., an approximate reduction in size of 80% to 90% may be achieved) or even better. Thus, the overall dimensional volume necessitated to construct the spectrometer 580 is substantially two-dimensional, or substantially unilateral, which is significantly reduced compared with that of its prior art spectrometer. Additionally, such a reduction in size is achieved with the spectrometer's performance characteristics being optimized. Thus it is possible to construct a spectrometer fabricated with a single piece of thin transparent carrier of pentagon shape, which is robust and of very compact volume.

Next referring to FIG. 6(a), a prior art compact spectrometer 600 is illustrated in ray-trace form. The optics of spectrometer 600 comprises an entrance aperture 604 that may be the core of the optical fiber 602 for input signal delivery, a lens 608 for both collimating and focusing, and a reflective diffraction grating 612. For the spectrometer 600, the input light 606 emits from the entrance aperture 604 and propagates in divergence toward the lens 608, which collimates the divergent light 606 into the collimated light 610. The collimated light 610 propagates and may be incident upon the grating 612, which disperses, in a reflective manner, the light 610 into the dispersive collimated light 614, and then the same lens 608 focuses the light 614 into the convergent light 618 to form spectral images 620 on the detector 622. As shown in FIG. 6(a), the propagation paths for the divergent light 606, the collimated light 610, the dispersive light 614, and the convergent light 618 are all three-dimensional. The two key optical elements within the spectrometer 600, i.e., the lens 608 and the grating 612, must have finite working apertures large enough to accept and to manipulate the light 606, 610, 614 and 618 without truncating such light at any locations. As a result, the overall dimensional volume necessitated to construct the spectrometer 600 is three-dimensional. Such a spectrometer is generally large and very difficult to be reduced without sacrificing its performance characteristics.

Figure 6:
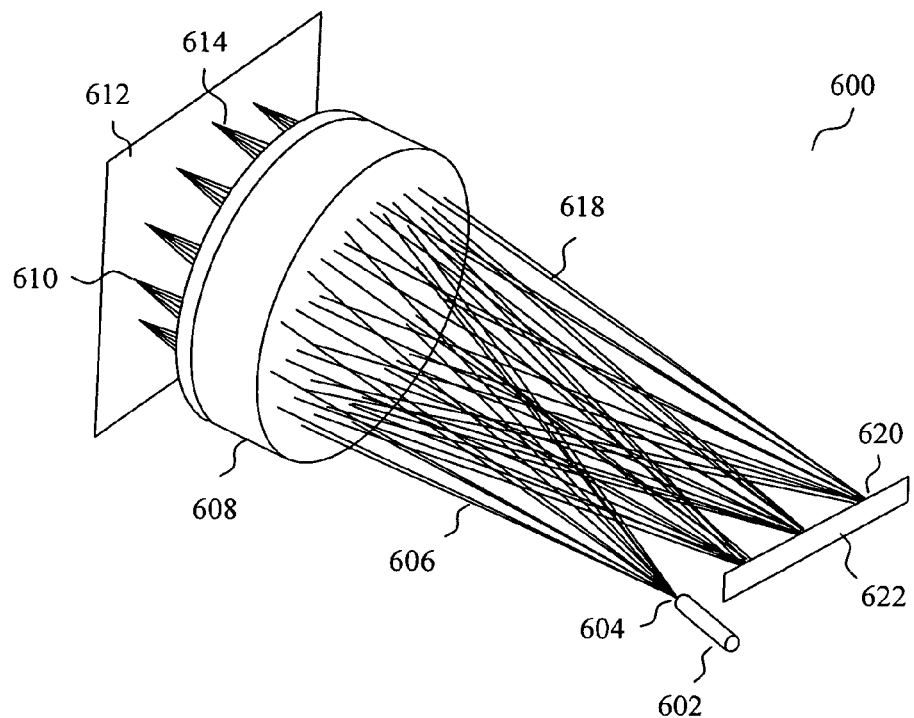
FIG. 6(a) is a perspective view of a prior art compact spectrometer comprising a lens and a reflective grating.
FIGS. 6(b) and (c) illustrate the same type of spectrometer as in FIG. 6(a), but incorporating features of various embodiments of the invention.
Figure 6:
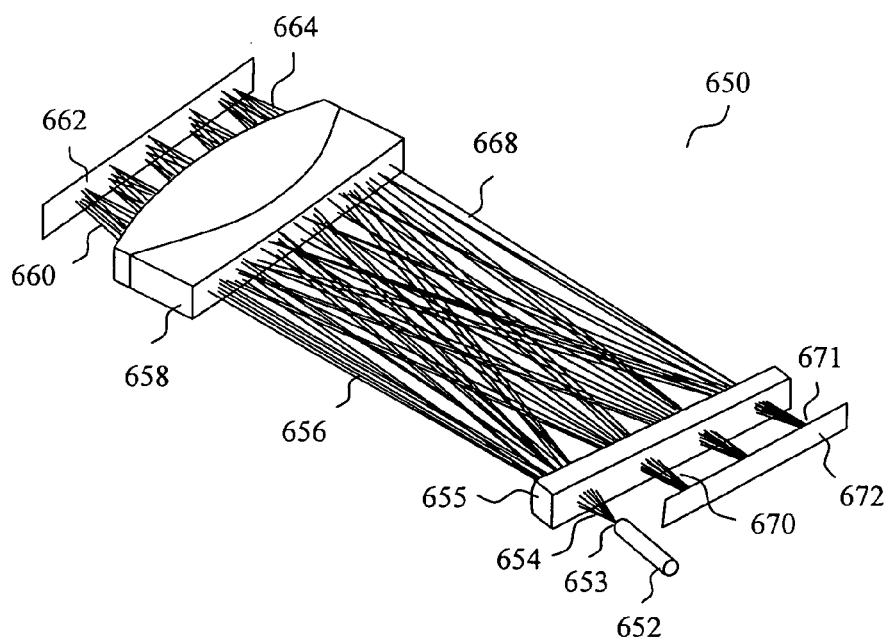

FIG. 6(*b*) shows, in ray-trace form, a compact spectrometer 650 incorporating features of an embodiment of the invention. Such spectrometer is of the same type as that shown in FIG. 6(*a*). The optics of spectrometer 650 comprises an entrance aperture 653 that may be the core of the optical fiber 652 for input signal delivery, a first lens 655, a second lens 658, and a reflective diffraction grating 662. For the spectrometer 650, the input light 654 emits from the entrance aperture 653 and propagates in divergence over a very short distance, then is transmitted through the first lens 655, which collimates the divergent light 654 only in the tangential plane, converting it into a partially collimated light, i.e., the anamorphic light 656, which is collimated in the tangential plane, but remains divergent in the sagittal plane. The light 656 propagates and is transmitted through the second lens 658, which collimates it only in the sagittal plane, converting it into the fully collimated light 660. The light 660 continues to propagate and is incident upon the grating 662, which disperses, in a reflective manner, the light 660 into dispersive collimated light 664. Upon being transmitted through the same lens 658, the light 664 is partially focused in the sagittal plane into the light 668, which is further partially focused by the lens 655 in the tangential plane into the fully convergent light 670 to form spectral images 671 on the detector 672. As shown in FIG. 6(*b*), the propagation paths for the anamorphic light 656, collimated light 660, dispersive light 664, and the anamorphic light 668 are all substantially two-dimensional. The three key optical elements within the spectrometer 650, i.e., the first lens 655, the second lens 658 and the grating 662, which are properly chosen in combination in forms of toroidal, cylindrical and planar elements, must have finite working aperture dimensions large enough only in the sagittal direction (i.e., horizontal), but very small aperture dimensions needed in the tangential direction (i.e., vertical), in order to accept and to manipulate light 654, 656, 660, 664, 668 and 670 without truncating such light at any locations. In practice, the tangential dimensions (i.e., vertical) of those key optical elements needed become small fractions of their original values in the same prior art, for example, around $1/5 \sim 1/10$ (i.e., an approximate reduction in size of 80% to 90% may be achieved) or even better. As a result, the overall dimensional volume necessitated to construct the spectrometer 650 is substantially two-dimensional, or substantially unilateral, which is significantly reduced compared with that of its prior art spectrometer. Additionally, such a reduction in size is achieved with the spectrometer performance characteristics being optimized.

FIG. 6(*c*) shows, in ray-trace form, a compact spectrometer 680. Such a spectrometer is of the same type as that shown in FIG. 6(*a*). The optics of spectrometer 680 comprises an entrance aperture 683 that may be the core of the optical fiber 682 for input signal delivery, a first surface 686, a second surface 688, a reflective diffraction grating 691 and a third surface 695. For the spectrometer 680, the input light 684 emits from the entrance aperture 683 and propagates in divergence over a very short distance, then is transmitted through the first surface 686, which collimates the divergent light 684 only in the tangential plane, converting it into a partially collimated light, i.e., the anamorphic light 687, which is collimated in the tangential plane, but remains slower divergent in the sagittal plane. The light 687 propagates and is transmitted through the second surface 688, which collimates it only in the sagittal plane, converting it into the fully collimated light 690. The light 690 continues to propagate and is incident upon the grating 691, which disperses, in a reflective manner, the light 690 into dispersive collimated light 692. Upon being transmitted through the same surface 688, the light 692 is partially focused in the sagittal plane into the light 694, which is further partially focused by the third surface 695 in the tangential plane into the fully convergent light 696 to form spectral images 698 on the detector 699. As shown in FIG. 6(*c*), the propagation paths for the anamorphic light 687, collimated light 690, dispersive light 692, and the anamorphic light 694 are all substantially two-dimensional. The four key optical elements/surfaces within the spectrometer 680, i.e., the first surface 686, the second surface 688, the grating 691 and the third surface 695, which are properly chosen in combination in forms of toroidal, cylindrical and surface, must have finite working aperture dimensions large enough only in the sagittal direction (i.e., horizontal), but very small aperture dimensions needed in the tangential direction (i.e., vertical), in order to accept and to manipulate light 684, 687, 690, 692, 694 and 696 without truncating such light at any locations. In practice, the tangential dimensions (i.e., vertical) of those key optical elements/surface needed become small fractions of their original values in the same prior art, for example, around $1/5 \sim 1/10$ (i.e., an approximate reduction in size of 80% to 90% may be achieved) or even better. Thus, the overall dimensional volume necessitated to construct the spectrometer 680 is substantially two-dimensional, or substantially unilateral, which is significantly reduced compared with that of its prior art spectrometer. Additionally, such a reduction in size is achieved with the spectrometer performance characteristics being optimized.

Figure 7:
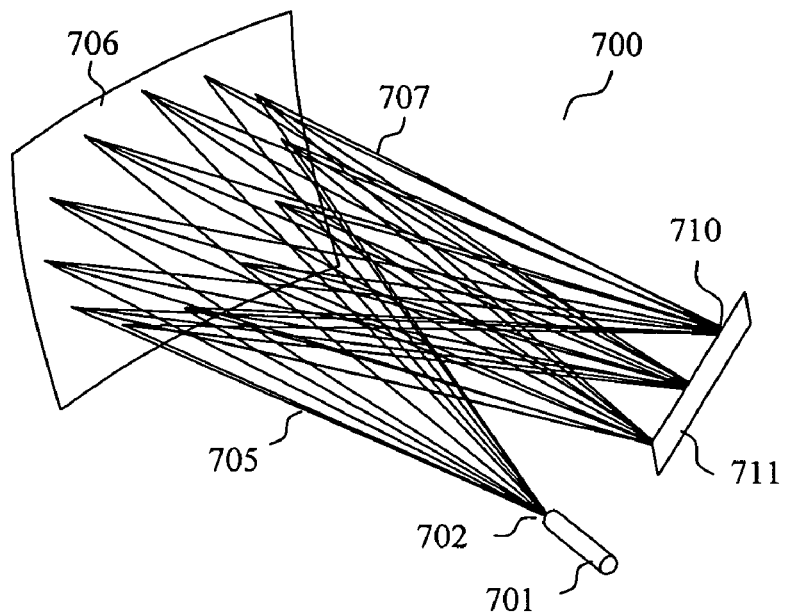
FIG. 7(a) is a perspective view of a prior art compact spectrometer comprising a concave grating only.
FIGS. 7(b) to (e) illustrate the same type of spectrometer as in FIG. 7(a), but incorporating features of various embodiments of the invention, specifically, FIGS. 7(c) and (e) show the same spectrometer built by a piece of monolithic transparent carrier body, respectively further incorporating features of at least one embodiment of the invention.
Figure 7:
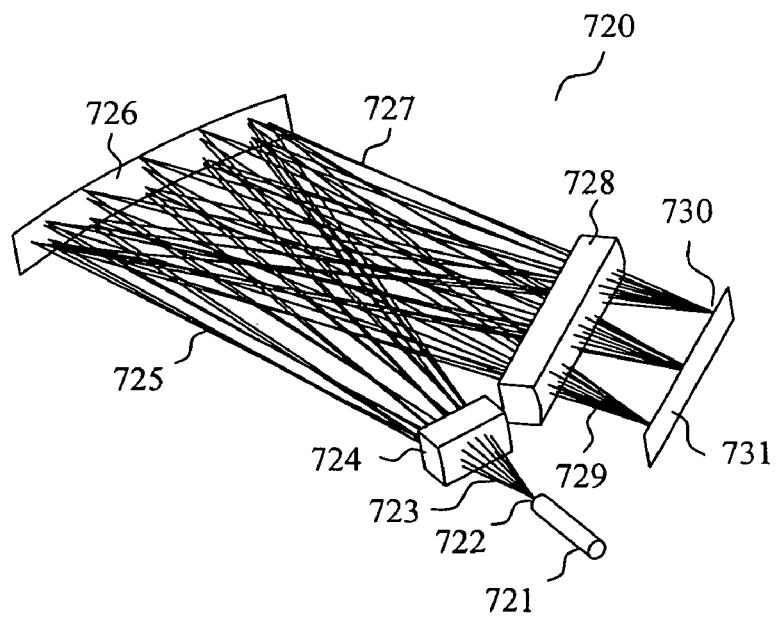
Figure 3:
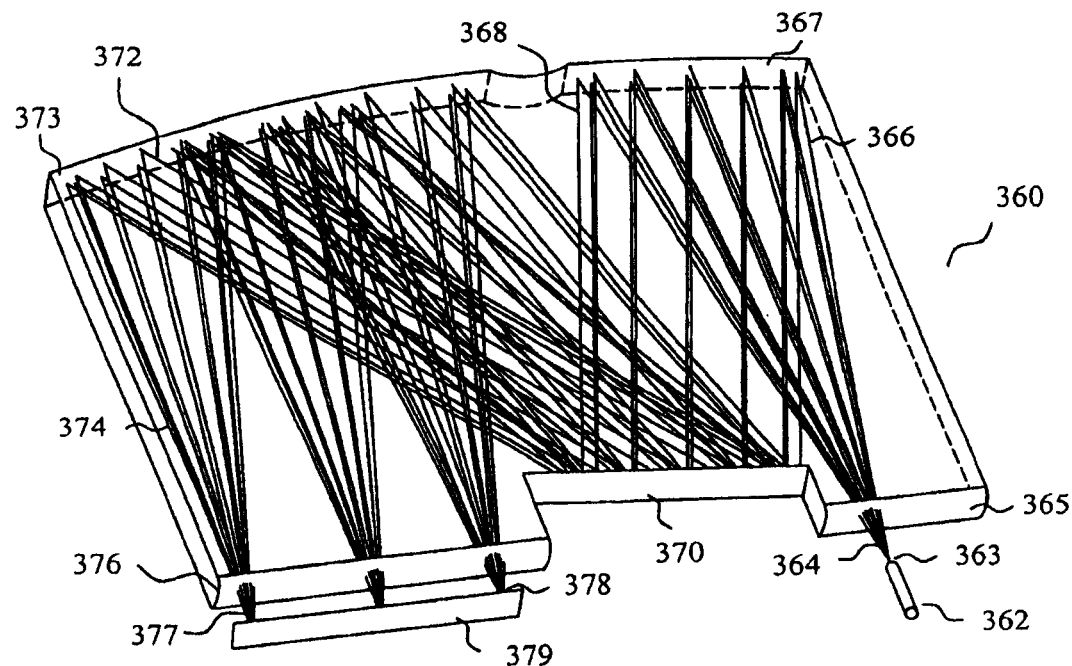
Figure 3:
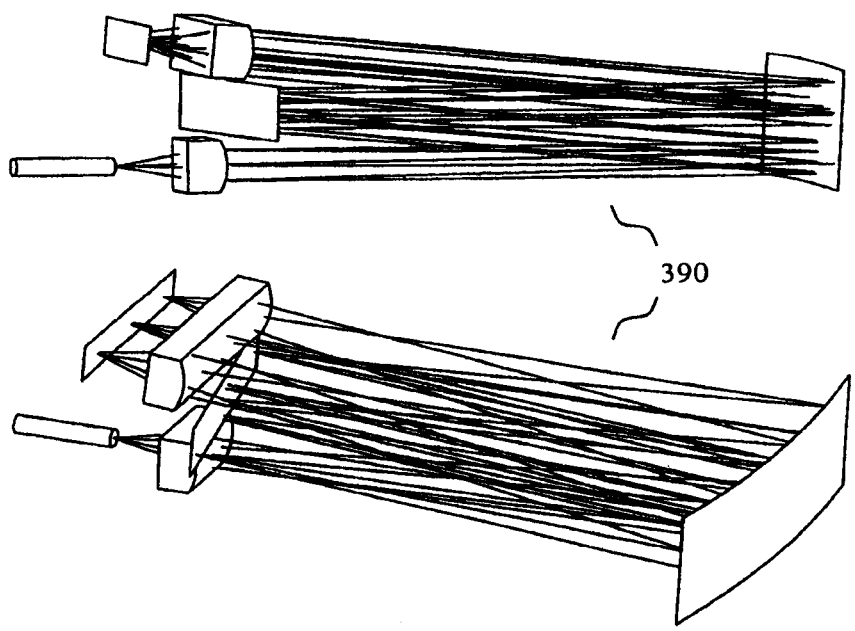
Figure 3:
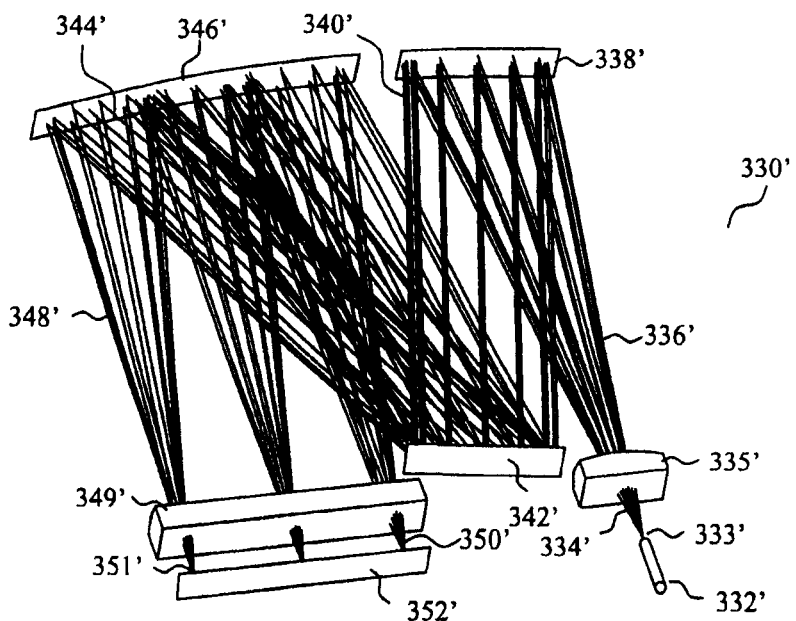
Figure 4:
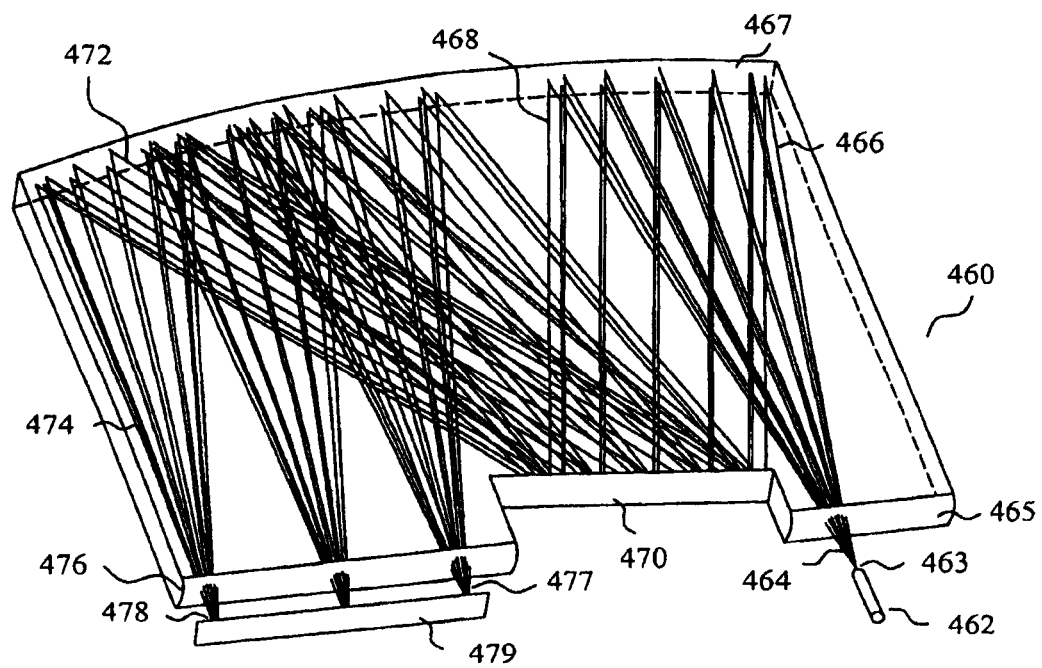
Figure 4:
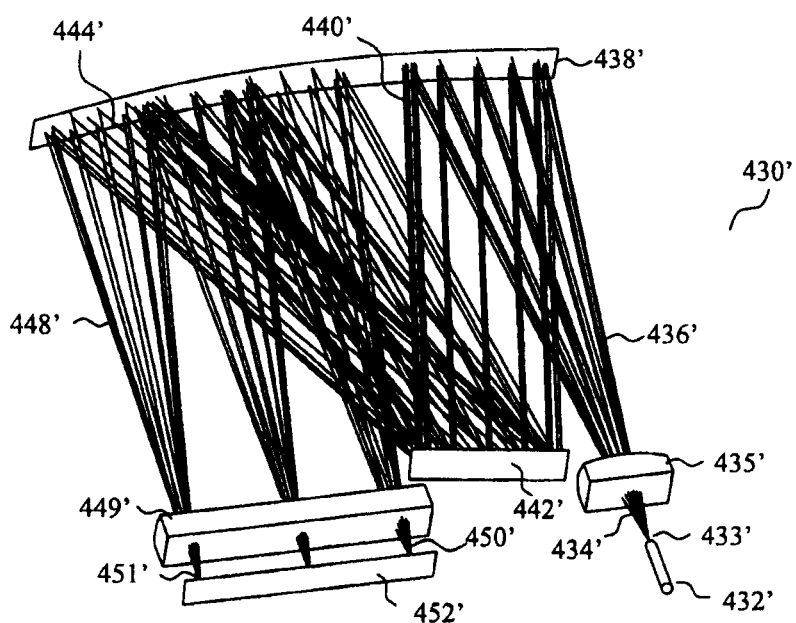
Figure 5:
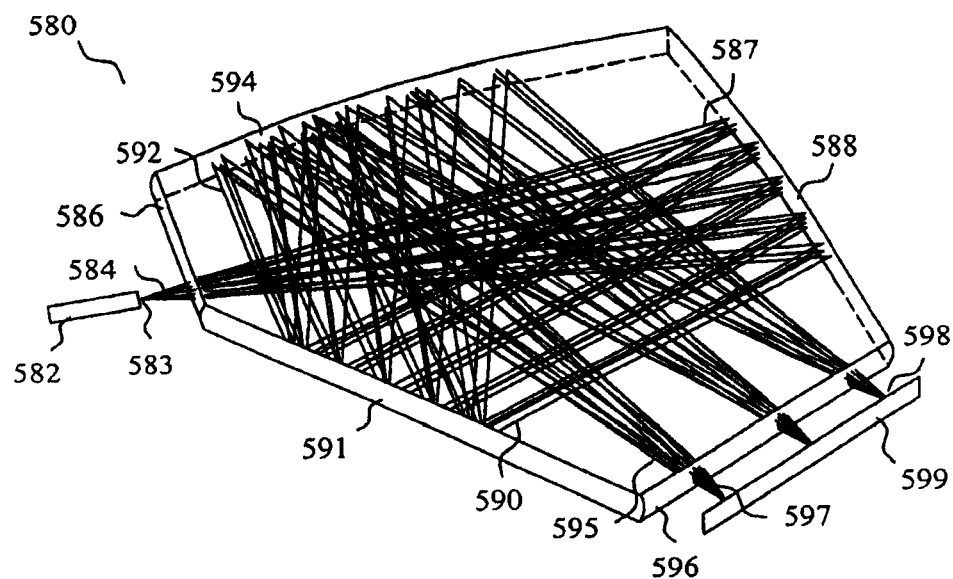
Figure 6:
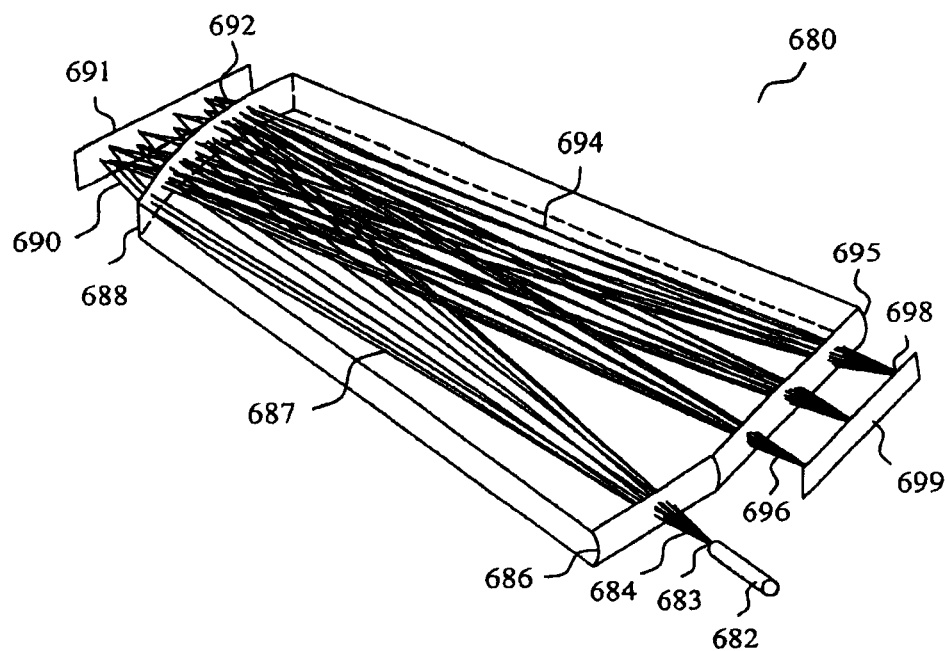
Figure 7:
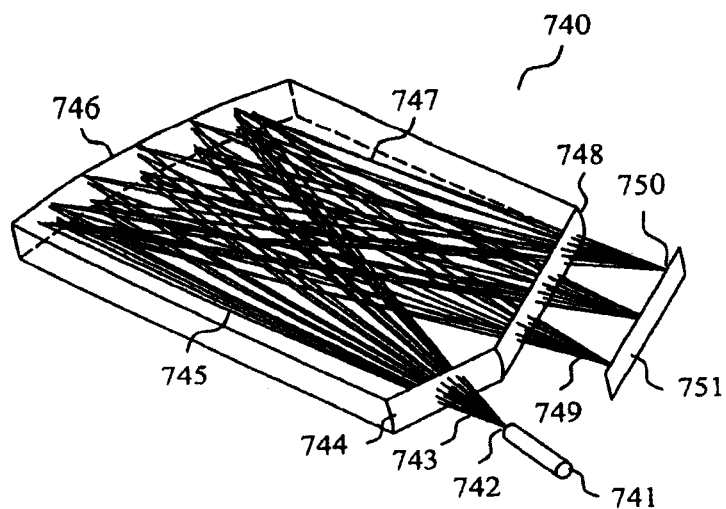
Figure 7:
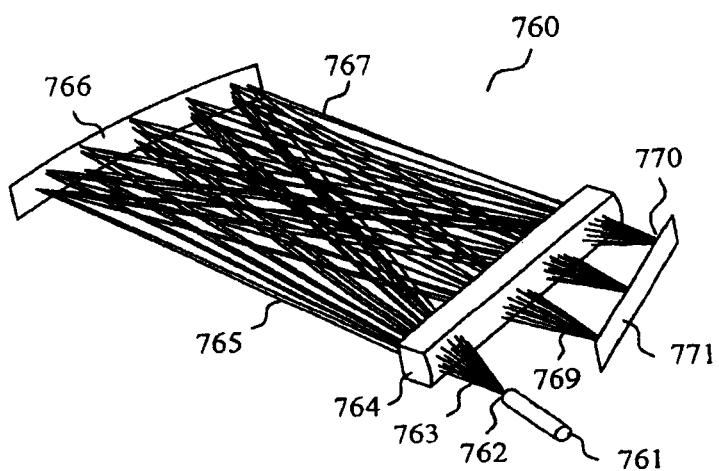
Figure 7:
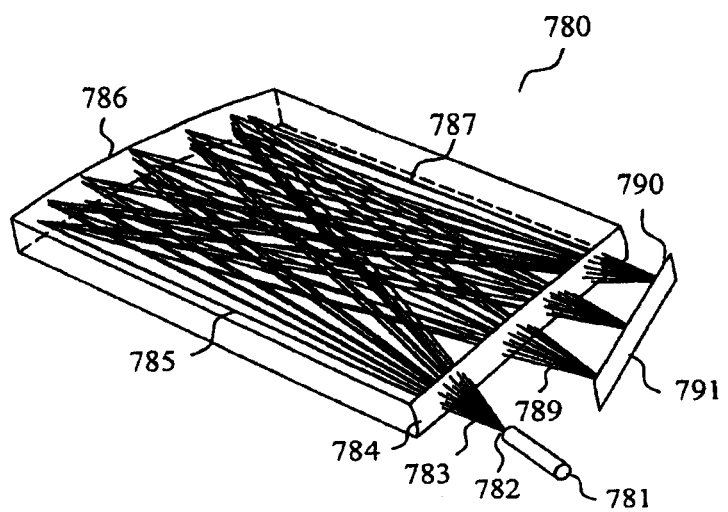

Next referring to FIG. 7(*a*), a prior art compact spectrometer 700 is illustrated in ray-trace form. The optics of spectrometer 700 comprises an entrance aperture 702 that may be the core of the optical fiber 701 for input signal delivery, and a concave diffraction grating 706. For the spectrometer 700, the input light 705 emits from the entrance aperture 702 and propagates in divergence towards the concave grating 706, which disperses, in a reflective manner, the divergent light 705 and focuses it into the convergent light 707 to form spectral images 710 on the detector 711. As shown in FIG. 7(*a*), the propagation paths for the divergent light 705 and the convergent light 707 are all three-dimensional. The single key optical element within the spectrometer 700, i.e., the concave grating 706, must have finite working apertures large enough to accept and to manipulate the light 705 and 707 without truncating them at any locations. As a result, the overall dimensional volume needed to construct the spectrometer 700 is three-dimensional. Such a spectrometer is generally still large for many applications and very difficult to be reduced without sacrificing its performance characteristics.

FIG. 7(*b*) shows, in ray-trace form, a compact spectrometer 720 that incorporates features of an embodiment of the invention. Such a spectrometer is of the same type as that shown in FIG. 7(*a*). The optics of spectrometer 720 comprises an entrance aperture 722 that may be the core of the optical fiber 721 for input signal delivery, a first lens 724, a concave grating 726, and a second lens 728. For the spectrometer 720, the input light 723 emits from the entrance aperture 722 and propagates in divergence over a very short distance, then is transmitted through the first lens 724, which collimates the divergent light 723 only in the tangential plane, converting it into a partially collimated light, i.e., the anamorphic light 725, which is collimated in the tangential plane, but remains slower divergent in the sagittal plane. The light 725 propagates and is reflected by the concave grating 726, which disperses, in a reflective manner, the light 725 and focuses it only in the sagittal plane into the anamorphic light 727, which remains collimated in the tangential plane, but is dispersed and convergent in the sagittal plane. Upon being transmitted through the second lens 728, the light 727 is focused in the tangential plane into the fully convergent light 729 to form spectral images 730 on the detector 731. As shown in FIG. 7(*b*), the propagation paths for the anamorphic light 725, and the dispersed anamorphic light 727 are all substantially two-dimensional. The three key optical elements within the spectrometer 720, i.e., the first lens 724, the grating 726, and the second lens 728, which are properly chosen in combination in forms of toroidal, cylindrical and planar elements, must have finite working aperture dimensions large enough only in the sagittal direction (i.e., horizontal), but very small aperture dimensions are needed in the tangential direction (i.e., vertical), in order to accept and to manipulate light 723, 725, 727 and 729 without truncating such light at any locations. In practice, the tangential dimensions (i.e., vertical) of those key optical elements needed become small fractions of their original values in the same prior art, for example, around $1/5 \sim 1/10$ (i.e., an approximate reduction in size of 80% to 90% may be achieved) or even better. As a result, the overall dimensional volume necessitated to construct the spectrometer 720 is substantially two-dimensional, or substantially unilateral, which is significantly reduced compared with that of its prior art spectrometer plus its performance characteristics being optimized.

FIG. 7(*c*) shows, in ray-trace form, a compact spectrometer 740 that incorporates features of an embodiment of the invention. Such a spectrometer is of the same type as those shown in FIGS. 7(*a*) and (*b*). The spectrometer 740 is constructed by combining the three key optical elements in the spectrometer 720 together with a single piece of monolithic transparent carrier. The optics of spectrometer 740 comprises an entrance aperture 742 that may be the core of the optical fiber 741 for input signal delivery, a first surface 744, a concave grating 746, and a second surface 748. For the spectrometer 740, the input light 743 emits from the entrance aperture 742 and propagates in divergence over a very short distance, then is transmitted through the first surface 744, which collimates the divergent light 743 only in the tangential plane, converting it into a partially collimated light, i.e., the anamorphic light 745, which is collimated in the tangential plane, but remains slower divergent in the sagittal plane. The light 745 propagates in the transparent medium and is intercepted by the concave grating 746, which disperses, in a reflective manner, the light 745 and focuses it only in the sagittal plane into the anamorphic light 747, which remains collimated in the tangential plane, but is dispersed and convergent in the sagittal plane. Upon being transmitted through the second surface 748, the light 747 is focused in the tangential plane into the fully convergent light 749 to form spectral images 750 on the detector 751. As shown in FIG. 7(*c*), the propagation paths for the anamorphic light 745 and the anamorphic light 747 are all substantially two-dimensional. The three key optical surfaces within the spectrometer 740, i.e., the first surface 744, the concave grating 746 and the second surface 748, which are properly chosen in combination in forms of toroidal, cylindrical and planar surface, must have finite working aperture dimensions large enough only in the sagittal direction (i.e., horizontal), but very small aperture dimensions are needed in the tangential direction (i.e., vertical), in order to accept and manipulate light 743, 745, 747 and 749 without truncating such light at any locations. In practice, the tangential dimensions (i.e., vertical) of those key optical surfaces needed may become small fractions of their original values in the same prior art, for example, around $1/5 \sim 1/10$ (i.e., an approximate reduction in size of 80% to 90% may be achieved) or even better. Thus, the overall dimensional volume necessitated to construct the spectrometer 740 is substantially two-dimensional, or substantially unilateral, which is significantly reduced compared with that of its prior art spectrometer. Additionally, such a reduction in the overall dimensional volume is achieved with the spectrometer performance characteristics being optimized. Thus it is possible to easily construct a spectrometer fabricated with a single piece of thin transparent carrier, which is robust and of very compact volume.

FIG. 7(*d*) shows, in ray-trace form, a compact spectrometer 760 that incorporates features of an embodiment of the invention. Such a spectrometer is of the same type as that shown in FIG. 7(*a*). The optics of spectrometer 760 comprises an entrance aperture 762 that may be the core of the optical fiber 761 for input signal delivery, a lens 764 and a concave grating 766. For the spectrometer 760, the input light 763 emits from the entrance aperture 762 and propagates in divergence over a very short distance, then is transmitted through the lens 764, which collimates the divergent light 763 only in the tangential plane, converting it into a partially collimated light, i.e., the anamorphic light 765, which is collimated in the tangential plane, but remains slower divergent in the sagittal plane. The light 765 propagates and is intercepted by the concave grating 766, which disperses, in a reflective manner, the light 765 and focuses it only in the sagittal plane into the anamorphic light 767, which remains collimated in the tangential plane, but is dispersed and convergent in the sagittal plane. Upon being transmitted through the same lens 764, the light 767 is focused in the tangential plane into the fully convergent light 769 to form spectral images 770 on the detector 771. As shown in FIG. 7(*d*), the propagation paths for the anamorphic light 765, and the dispersed anamorphic light 767 are all substantially two-dimensional. The two key optical elements within the spectrometer 760, i.e., the first lens 764, and the grating 766, which are properly chosen in combination in forms of toroidal and cylindrical elements, must have finite working aperture dimensions large enough only in the sagittal direction (i.e., horizontal), but very small aperture dimensions needed in the tangential direction (i.e., vertical), in order to accept and to manipulate light 763, 765, 767 and 769 without truncating such light at any locations. In practice, the tangential dimensions (i.e., vertical) of those key optical elements needed may become small fractions of their original values in the same prior art, for example, around $1/5 \sim 1/10$ (i.e., an approximate reduction in size of 80% to 90% may be achieved) or even better. Thus, the overall dimensional volume needed to construct the spectrometer 760 is substantially two-dimensional, or substantially unilateral, which is significantly reduced compared with that of its prior art spectrometer. Additionally, such a reduction in the overall dimensional volume is achieved with the spectrometer performance characteristics being optimized.

FIG. 7(*e*) shows, in ray-trace form, a compact spectrometer 780 that incorporates features of an embodiment of the invention. Such a spectrometer is of the same type as those shown in FIGS. 7(*a*) and (*d*). The spectrometer 780 is constructed by combining the two key optical elements in the spectrometer 760 together with a single piece of monolithic transparent carrier. The optics of spectrometer 780 comprises an entrance aperture 782 that may be the core of the optical fiber 781 for input signal delivery, a surface 784 and a concave grating 786. For the spectrometer 780, the input light 783 emits from the entrance aperture 782 and propagates in divergence over a very short distance, then is transmitted through the surface 784, which collimates the divergent light 783 only in the tangential plane, converting it into a partially collimated light, i.e., the anamorphic light 785, which is collimated in the tangential plane, but remains slower divergent in the sagittal plane. The light 785 propagates in the transparent medium and is reflected by the concave grating 786, which disperses, in a reflective manner, the light 785 and focuses it only in the sagittal plane into the anamorphic light 787, which remains collimated in the tangential plane, but is dispersed and convergent in the sagittal plane. Upon being transmitted through the same surface 784, the light 787 is focused in the tangential plane into the fully convergent light 789 to form spectral images 790 on the detector 791. As shown in FIG. 7(*e*), the propagation paths for the anamorphic light 785 and the anamorphic light 787 are all substantially two-dimensional. The two key optical surfaces within the spectrometer 780, i.e., the first surface 784 and the concave grating 786, which are properly chosen in combination forms of toroidal and cylindrical surface, must have finite working aperture dimensions large enough only in the sagittal direction (i.e., horizontal), but very small aperture dimensions needed in the tangential direction (i.e., vertical), in order to accept and to manipulate light 783, 785, 787 and 789 without truncating such light at any locations. In practice, the tangential dimensions (i.e., vertical) of those key optical surfaces needed may become small fractions of their original values in the same prior art, for example, around $1/5 \sim 1/10$ (i.e., an approximate reduction in size of 80% to 90% may be achieved) or even better. Consequently, the overall dimensional volume needed to construct the spectrometer 780 is substantially two-dimensional, or substantially unilateral, which is significantly reduced compared with that of its prior art spectrometer. Additionally, such a reduction in the overall dimensional volume is achieved with the spectrometer performance characteristics being optimized. Thus it is possible to easily construct a spectrometer fabricated with a single piece of thin transparent carrier, which is robust and of very compact volume.

Figure 8:
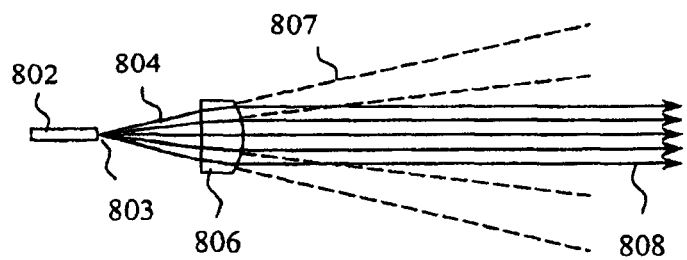
FIG. 8(a) to FIG. 8(e) show schematic views of five embodiments of a collimating means usable with embodiments of the invention. These embodiments also may be utilized in the focusing means for constructing compact spectrometers.
Figure 8:
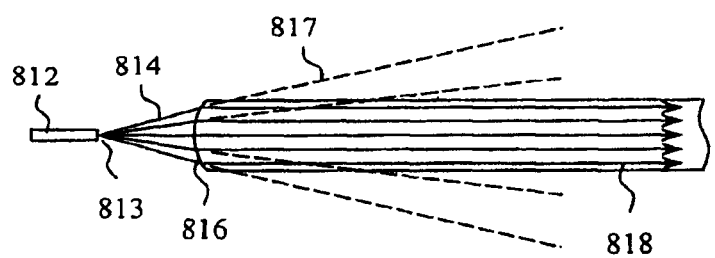
Figure 8:
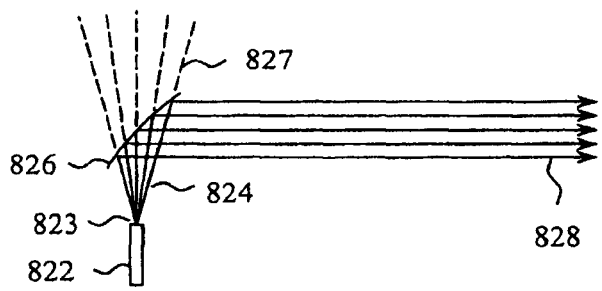
Figure 8:
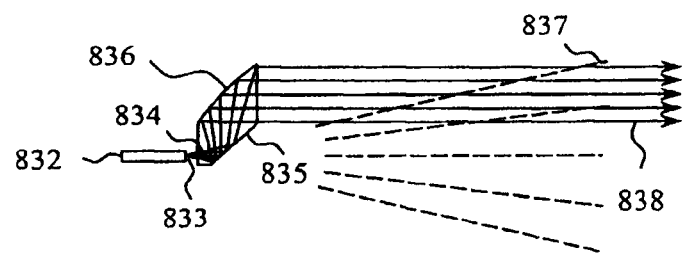
Figure 8:
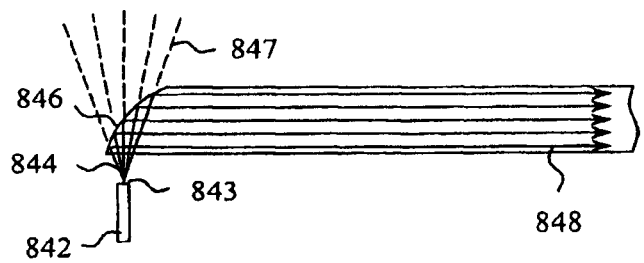

In FIGS. 8(*a*) to (*e*), five embodiments of a collimating means (collimator) based on embodiments are represented. Each collimator serves the same purpose and any of them may be chosen in building a specific spectrometer incorporating features of an embodiment of the invention. The functionalities of such collimating means have been described in those associated embodiments shown in FIG. 1 to FIG. 7. Thus, for purposes of brevity, only FIG. 8(*a*) will be described in detail. In FIG. 8(*a*), the input light 804 emits from the entrance aperture 803 that may be the core of the optical fiber 802 for input signal delivery, and propagates in divergence over a very short distance, then is intercepted by the cylindrical lens 806, which, as the light passes through the lens, collimates the divergent light 804 only in the tangential plane, converting it into a partially collimated light, i.e., the anamorphic light 808, which is collimated in the tangential plane, but remains divergent in the sagittal plane, leading to a propagation path that is substantially two-dimensional. Without using this cylindrical lens 806, the propagation path of light 804 would follow dashed-line 807, which is three-dimensional. The cylindrical lens 806 may be made from transparent optical materials. Either of its curved surfaces may be generally toroidal, i.e., having the major optical power in the tangential plane, but have minor or little optical power in the sagittal plane. Its section profile in the tangential plane may take any of the following forms: plano-convex, bi-convex, or meniscus, where curved profiles can be spherical, aspherical, or conic curves. The cylindrical lens 806 also can be used as the focusing means (focusing optics) for constructing the same compact spectrometer based on the present invention.

In FIG. 8(*b*), another embodiment for the collimating means is presented, which shows a cylindrical surface 816 formed on a monolithic transparent carrier, by which the compact spectrometer is constructed. The cylindrical surface 816 may be generally toroidal, i.e., having the major optical power in the tangential plane, but have minor or little optical power in the sagittal plane. Its section profile in the tangential plane may take any of the following forms: spherical, aspherical, or conic curves. The cylindrical surface 816 also can be used as the focusing means for constructing the same compact spectrometer based on the present invention.

In FIG. 8(*c*), another embodiment for the collimating means is presented, which shows a concave cylindrical mirror 826 at 45°. The mirror 826 may be generally toroidal, i.e., having the major optical power in the tangential plane, but have minor or little optical power in the sagittal plane. Its section profile in the tangential plane may take any of the following forms: spherical, aspherical, or conic curves. The concave cylindrical mirror 826 also may be used as the focusing means for constructing the same compact spectrometer based on the present invention.

In FIG. 8(*d*), another embodiment for the collimating means is presented, which shows a concave cylindrical mirror 836 at 45° working with a folding mirror 835 at 45°. For the purposes of easy manufacturing, mounting and aligning, these two mirrors may be constructed on the same piece of transparent material. The concave cylindrical mirror 836 may be generally toroidal, i.e., having the major optical power in the tangential plane, but have minor or little optical power in the sagittal plane. Its section profile in the tangential plane may take any of the following forms: spherical, aspherical, or conic curves. The assembly made by the concave cylindrical mirror 836 plus the 45° folding mirror 835 also may be used as the focusing means for constructing the same compact spectrometer incorporating features of embodiments of the invention.

In FIG. 8(*e*), another embodiment for the collimating means is presented, which shows a concave cylindrical mirror 846 formed at 45° on a monolithic transparent carrier, on which the compact spectrometer is constructed. The concave cylindrical mirror 846 may be generally toroidal, i.e., having the major optical power in the tangential plane, but have minor or little optical power in the sagittal plane. Its section profile in the tangential plane may take any of the following forms: spherical, aspherical, or conic curves. The concave cylindrical mirror 846 also can be used as the focusing means for constructing the same compact spectrometer based on aspects of the present invention.

Figure 9:
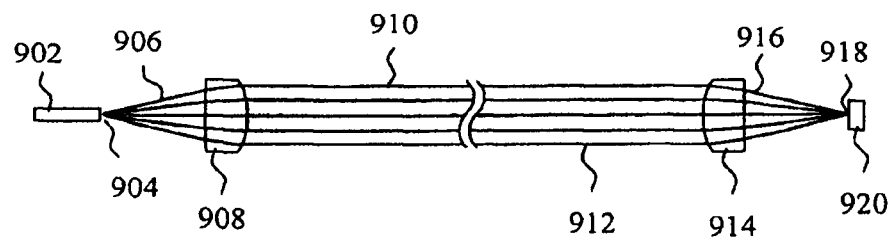
FIG. 9(a) and FIG. 9(b) show schematic views of two embodiments of the optical path configuration for the collimating means and the focusing means, for constructing compact spectrometers according to embodiments of the invention.
Figure 9:
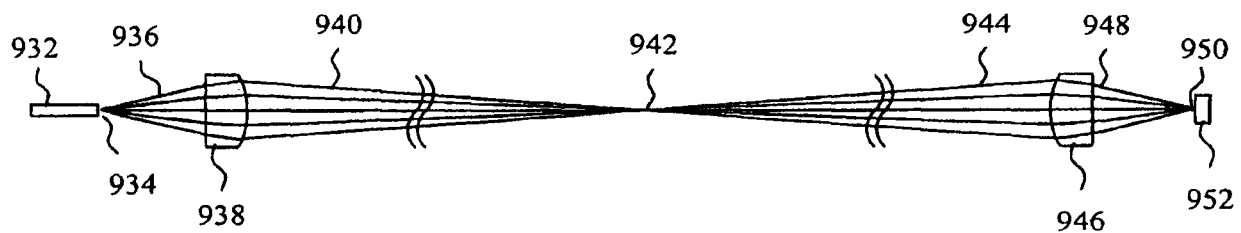
Figure 1:
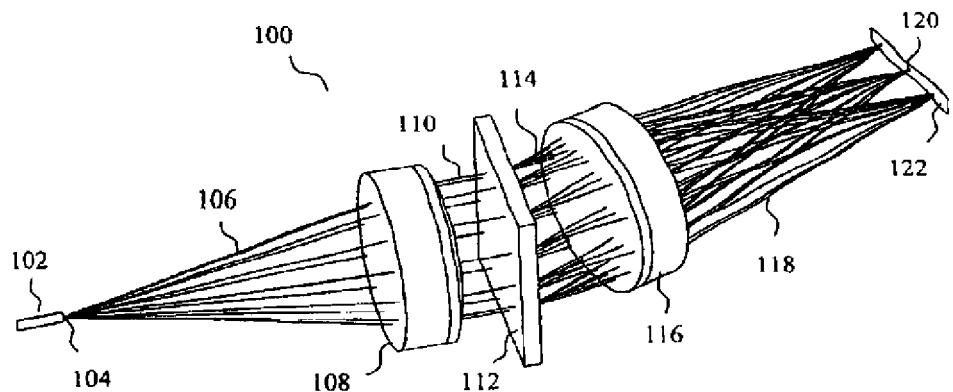
Figure 1:
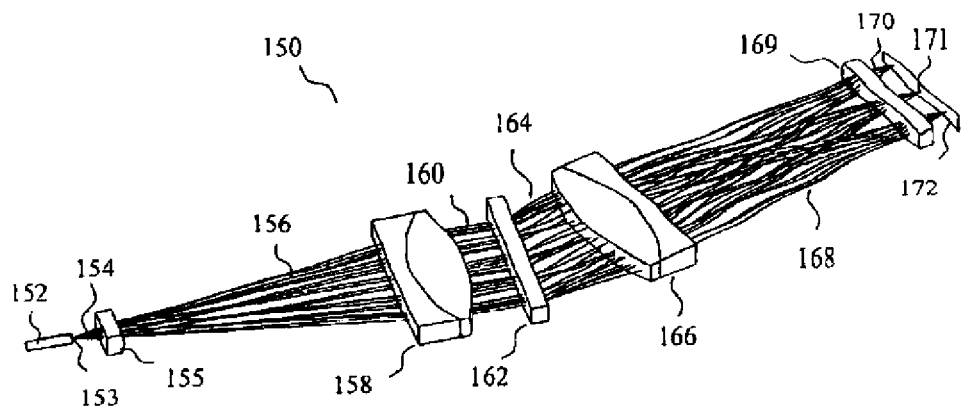
Figure 2:
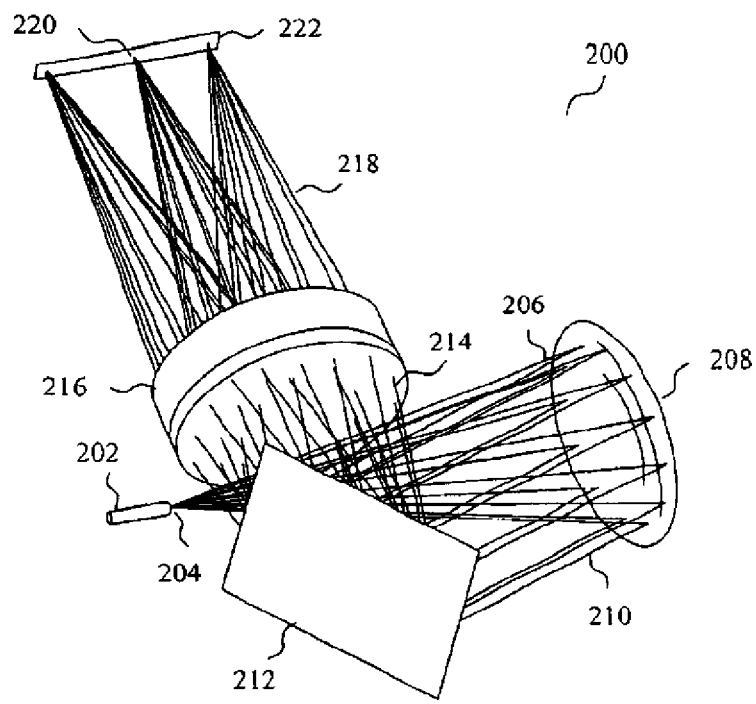
Figure 2:
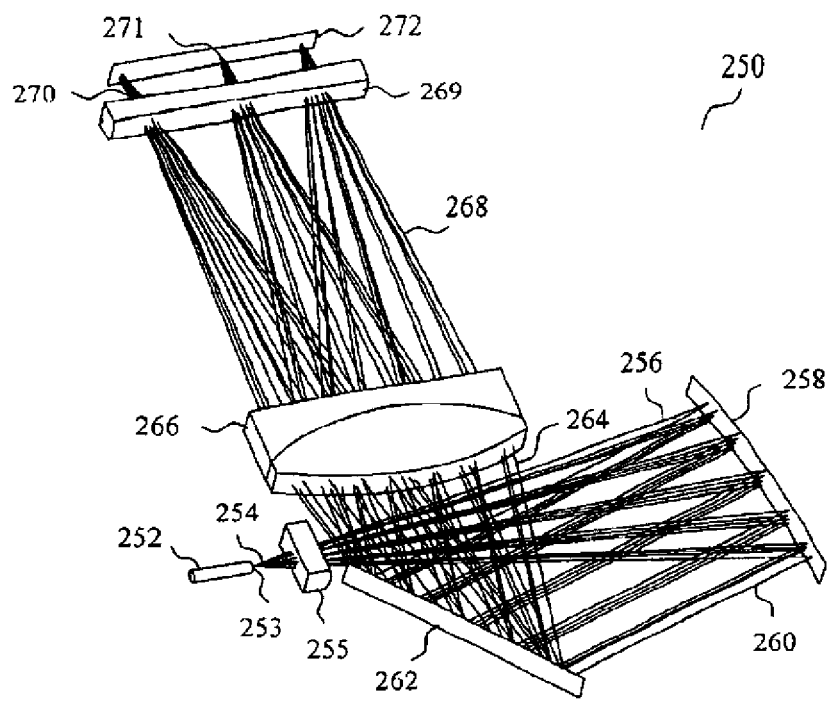
Figure 3:
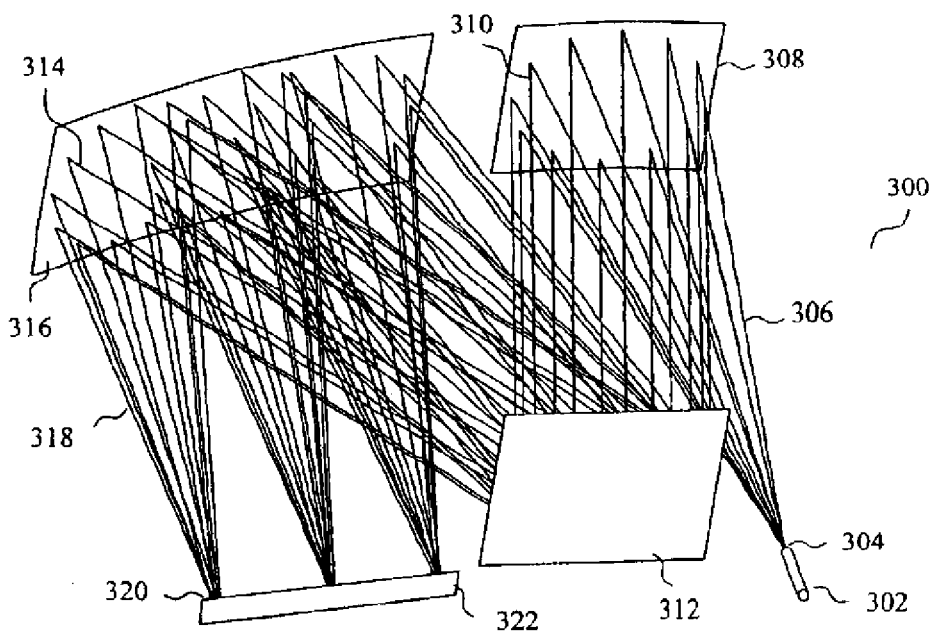
Figure 3:
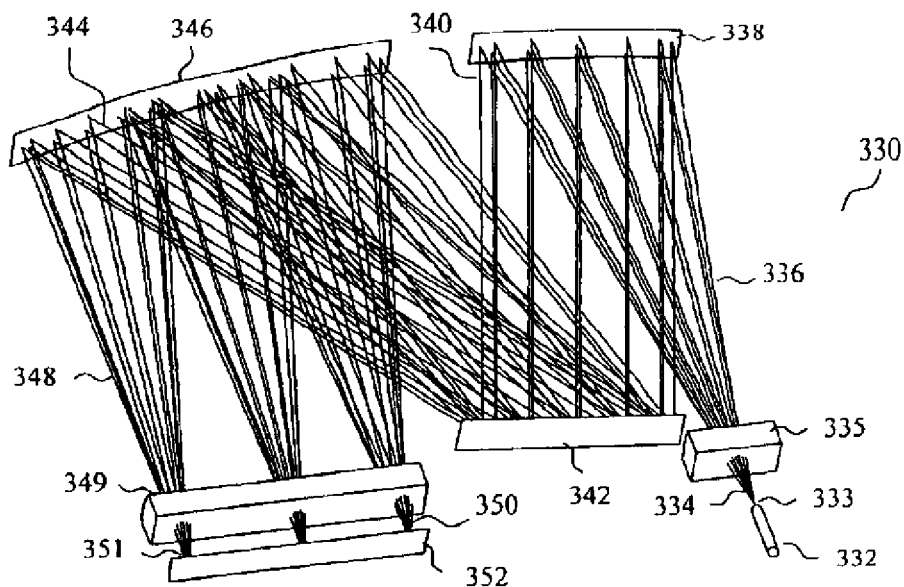
Figure 3:
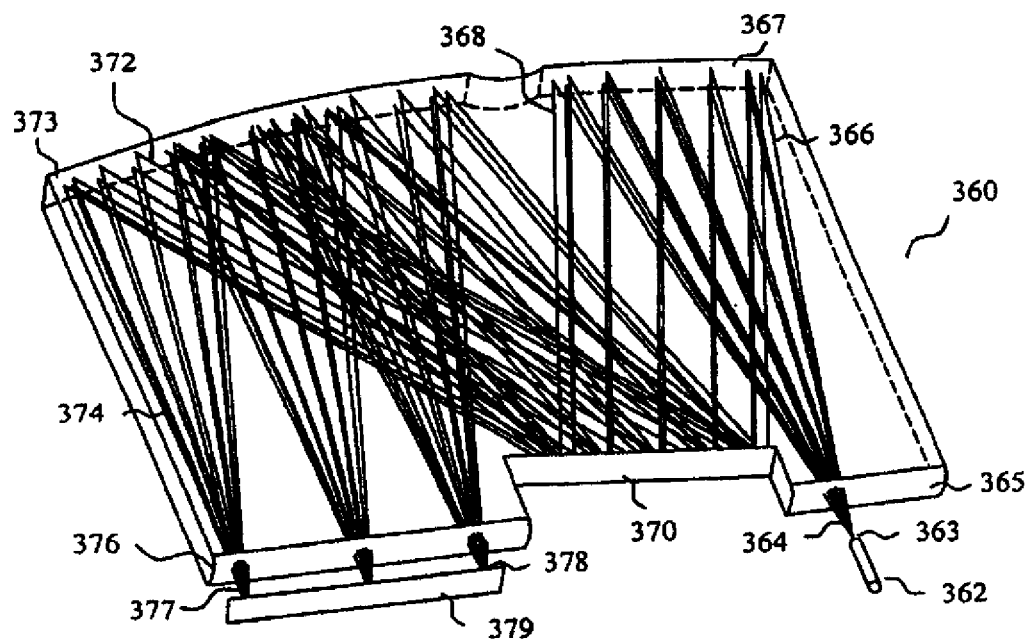
Figure 3:
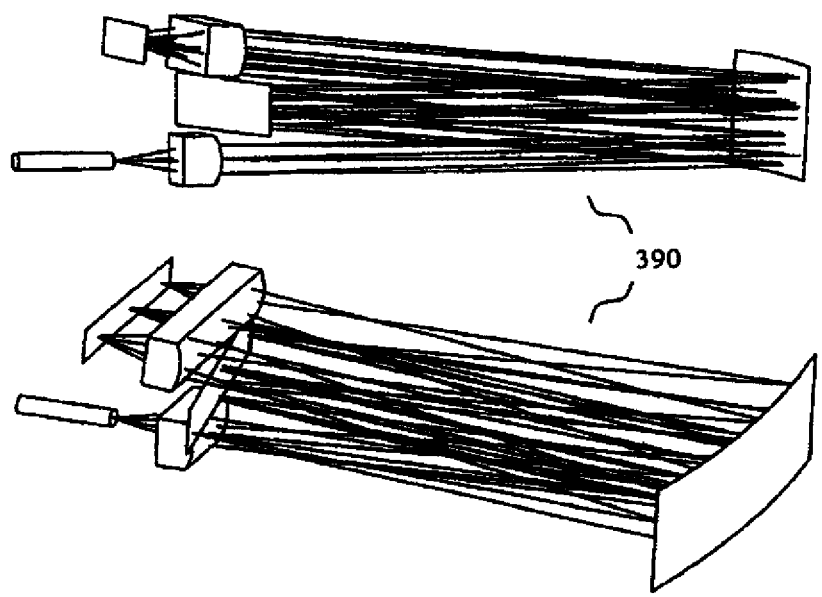
Figure 3:
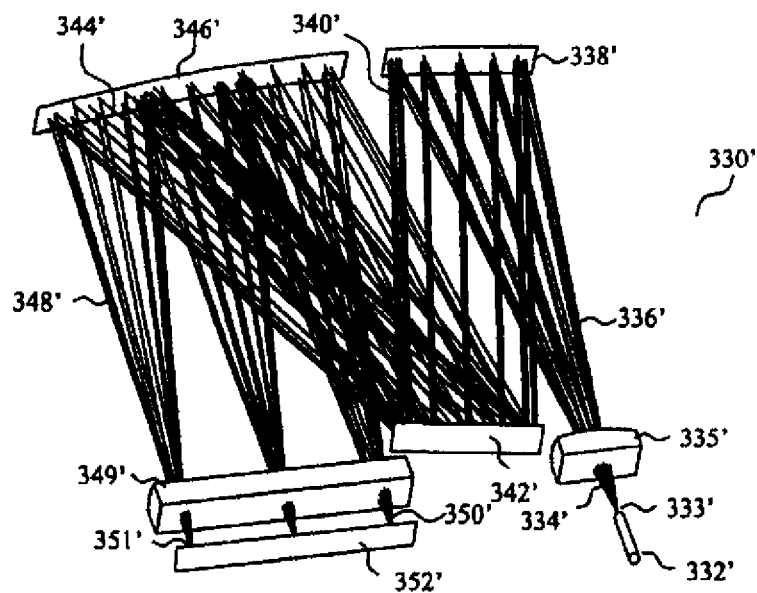
Figure 4:
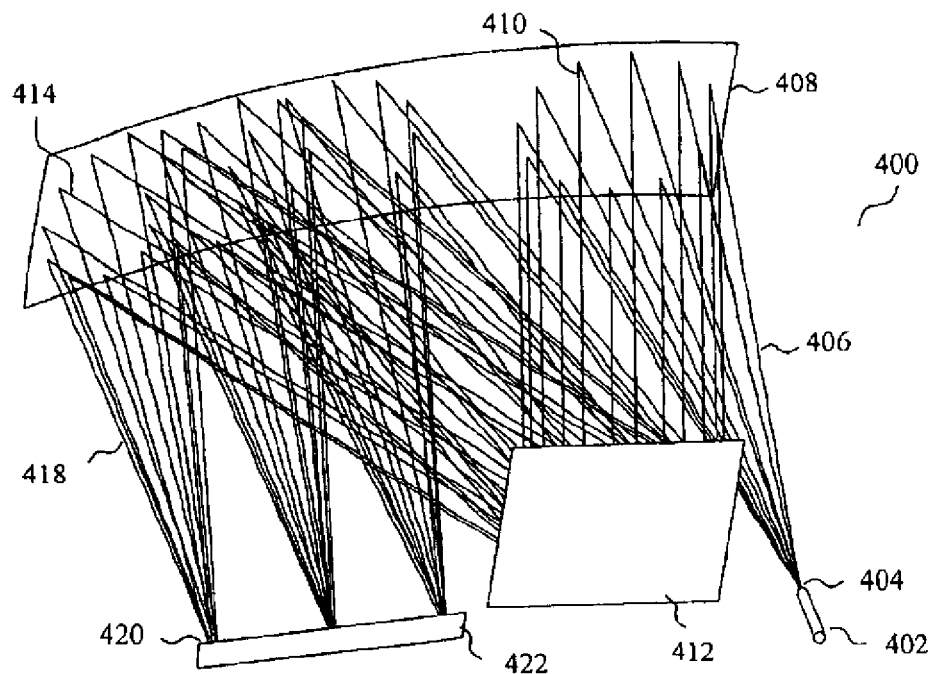
Figure 4:
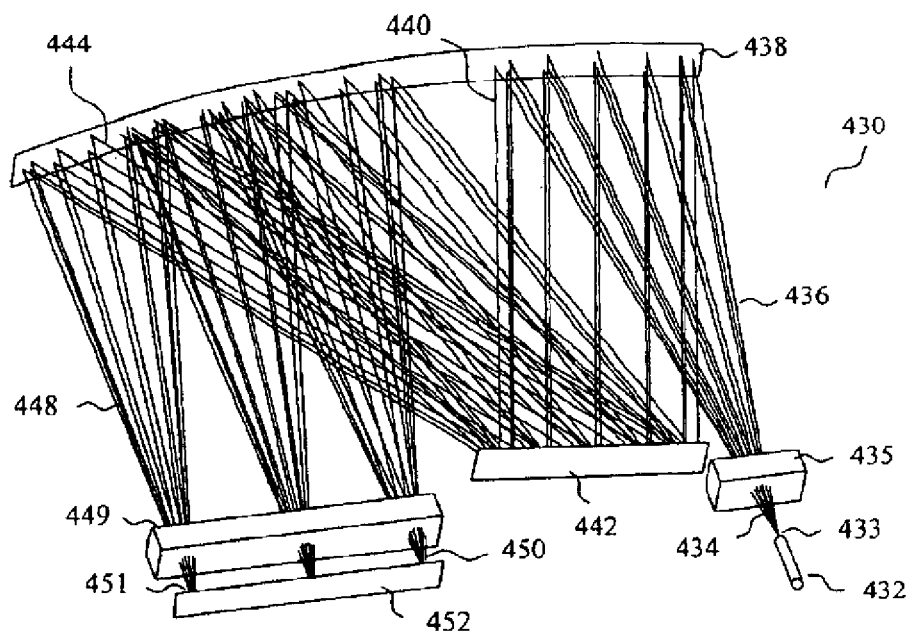
Figure 4:
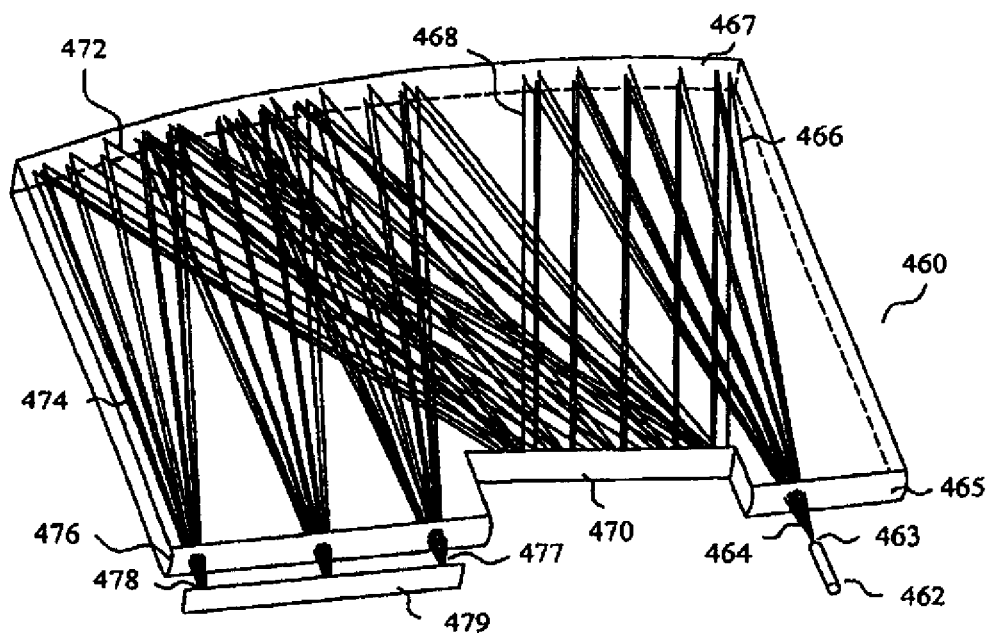
Figure 4:
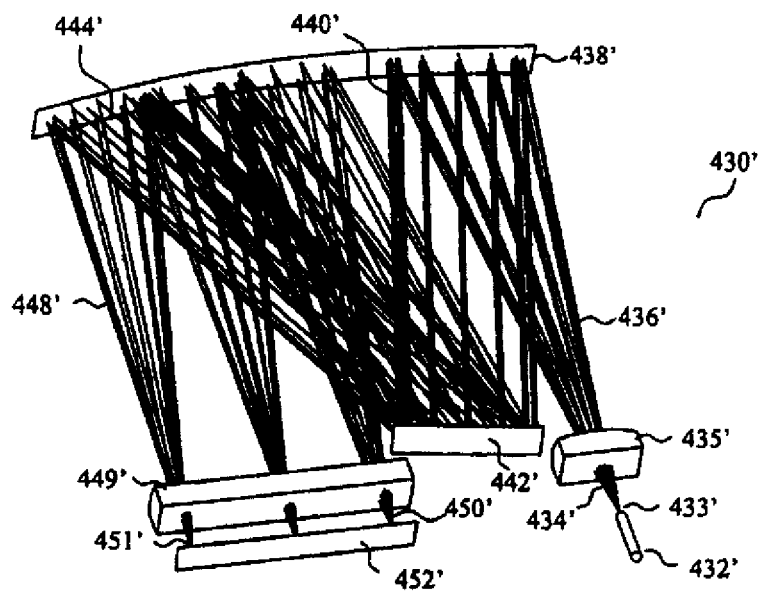
Figure 5:
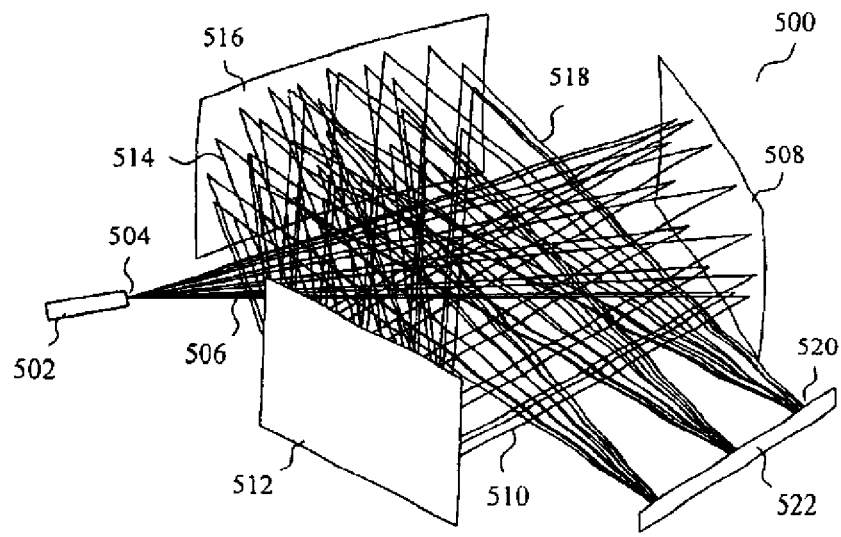
Figure 5:
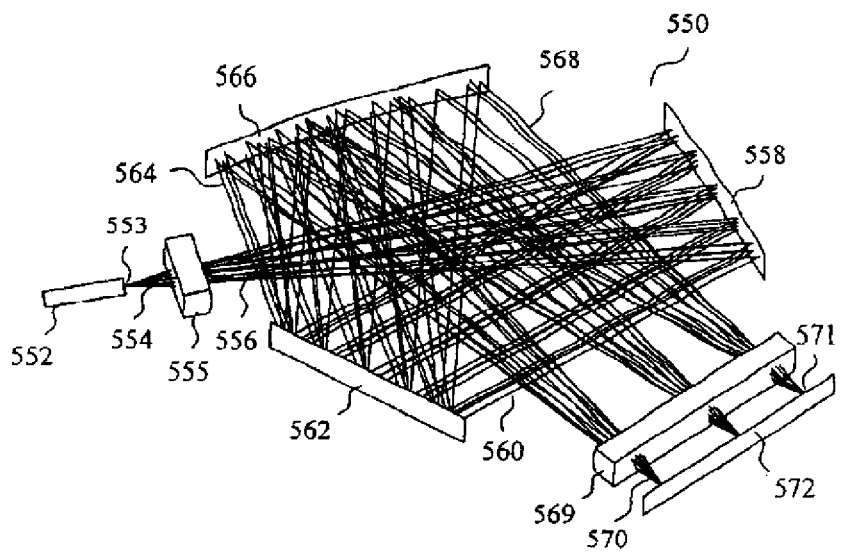
Figure 5:
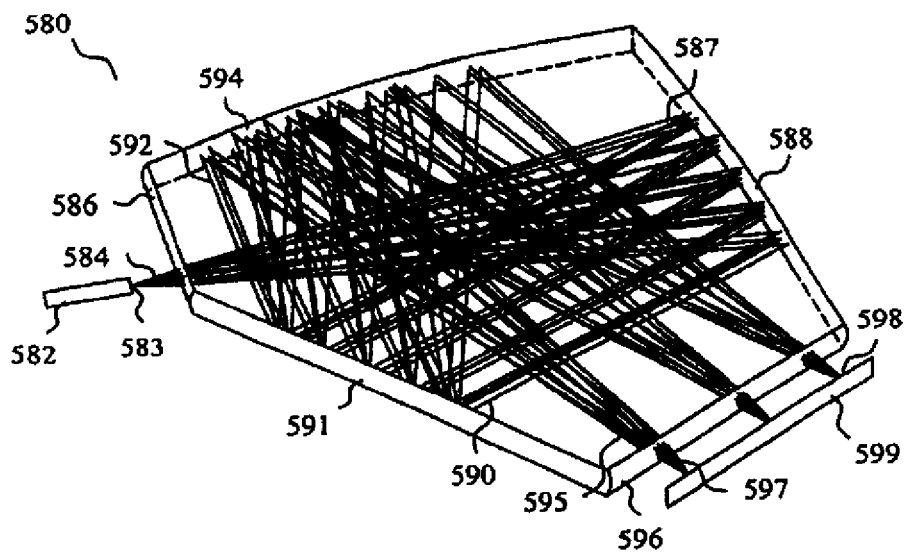
Figure 6:
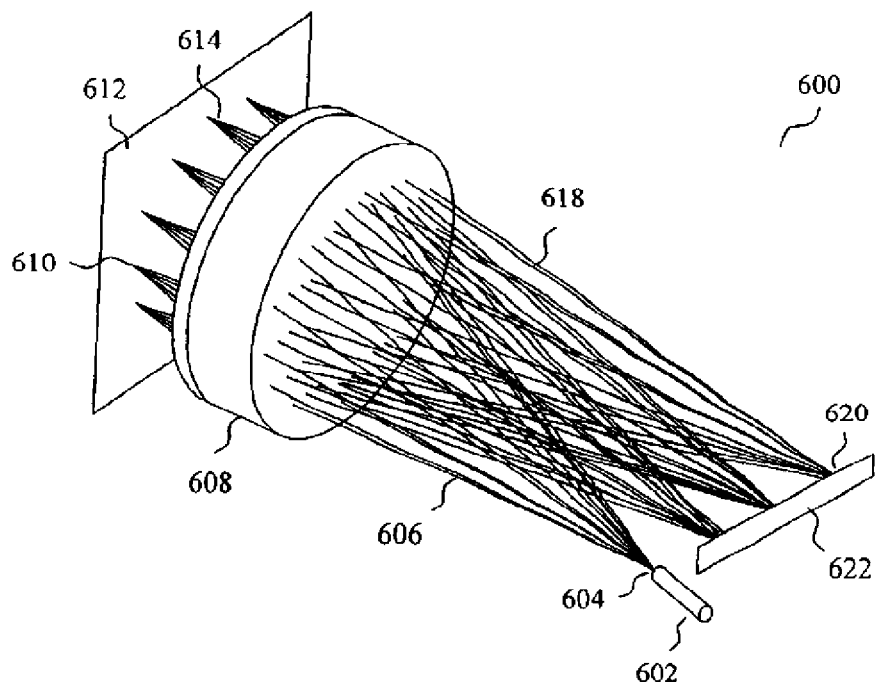
Figure 6:
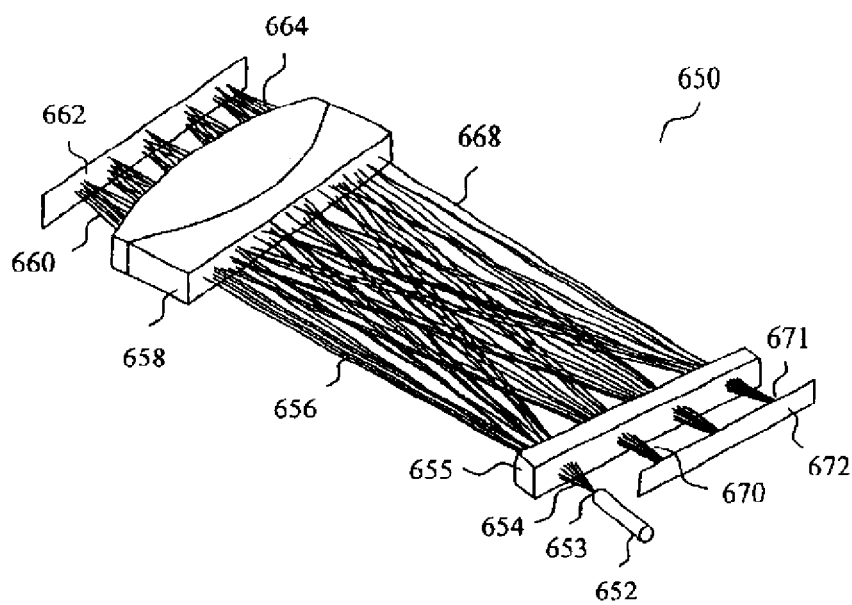
Figure 6:
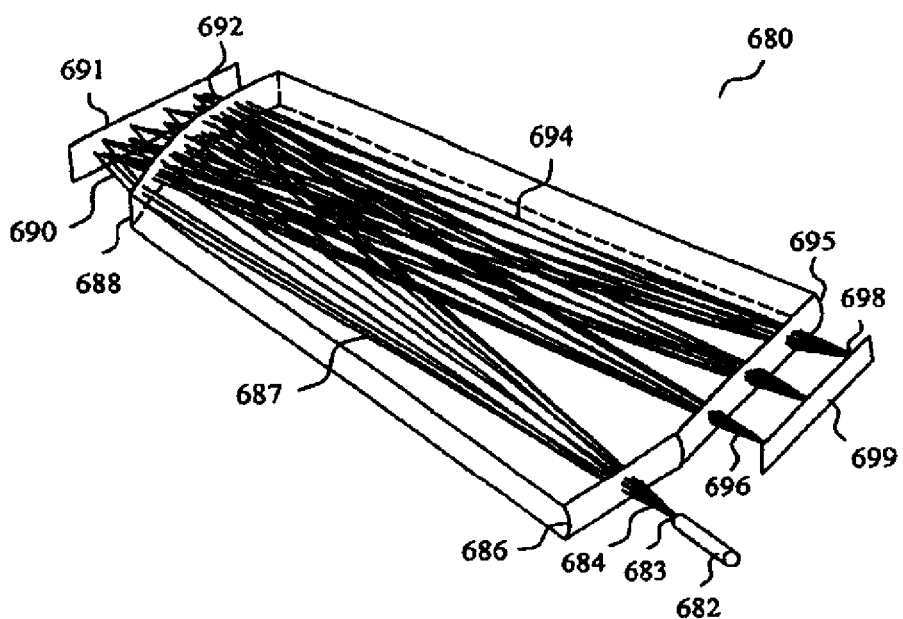
Figure 7:
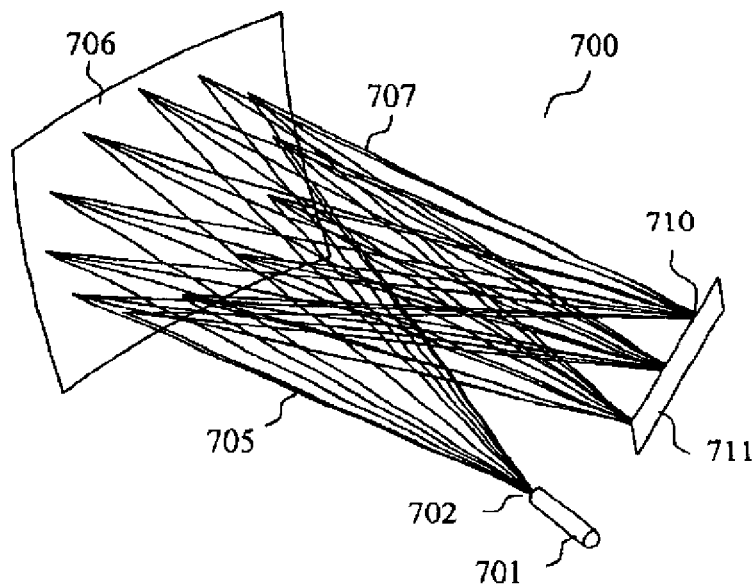
Figure 7:
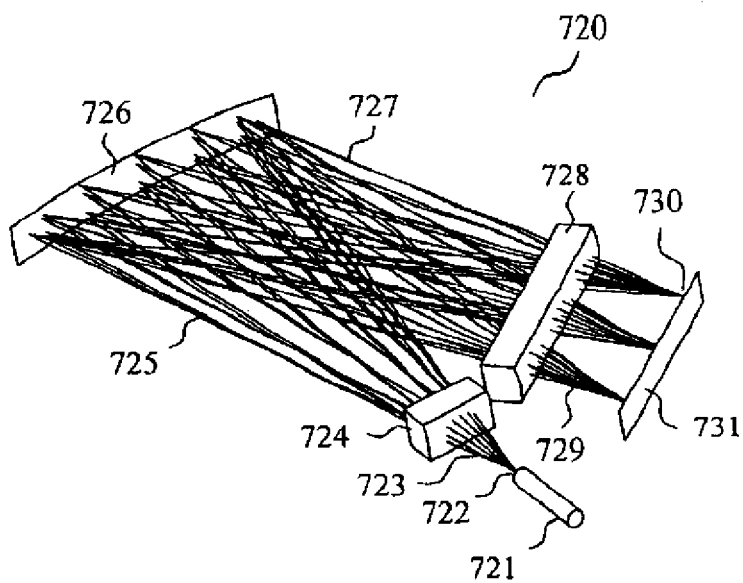
Figure 7:
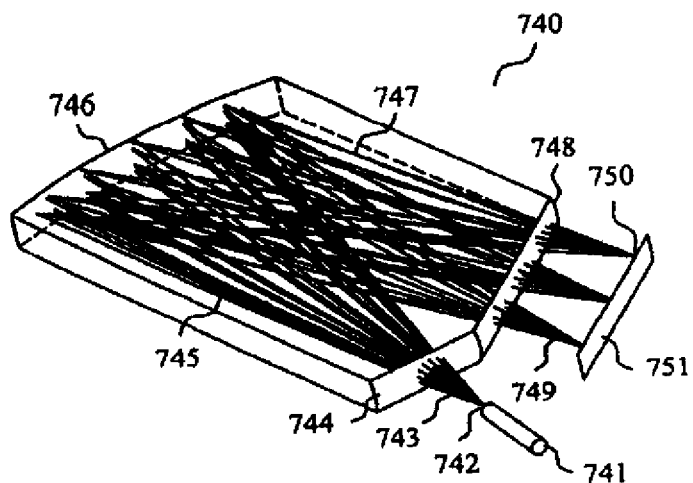
Figure 7:
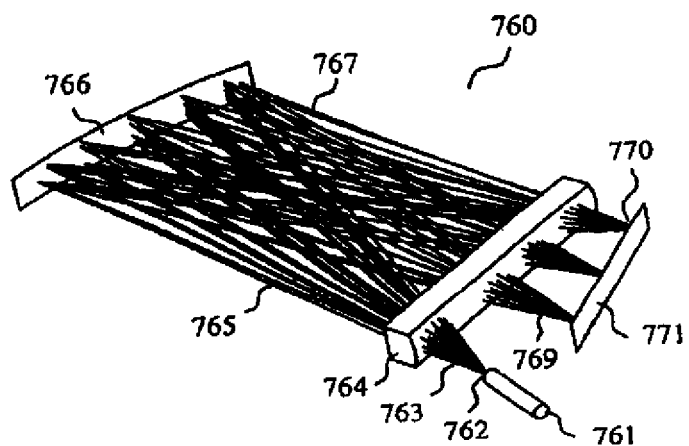
Figure 7:
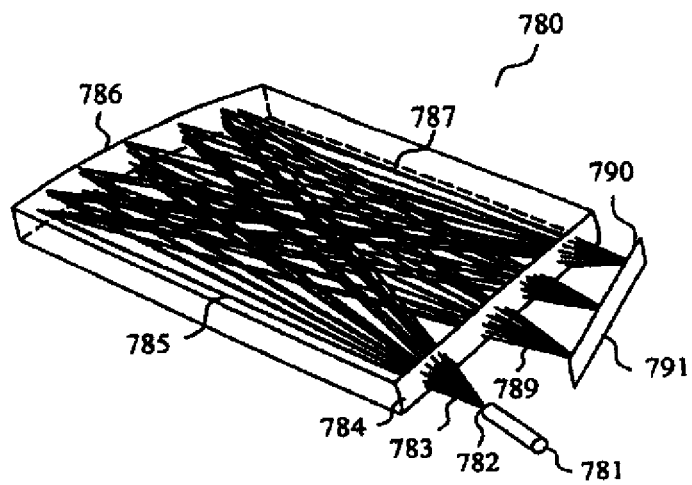
Figure 8:
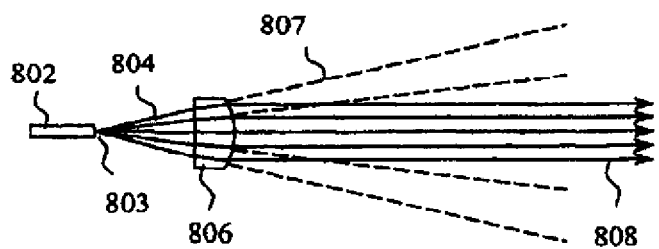
Figure 8:
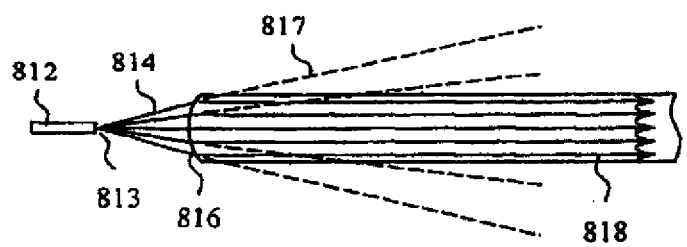
Figure 8:
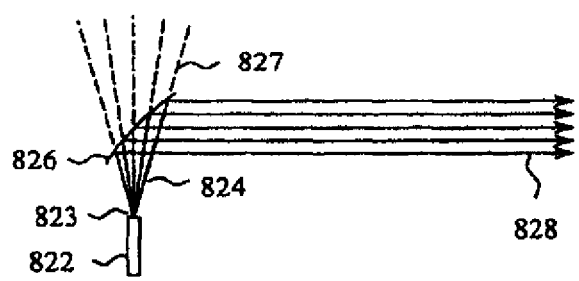
Figure 8:
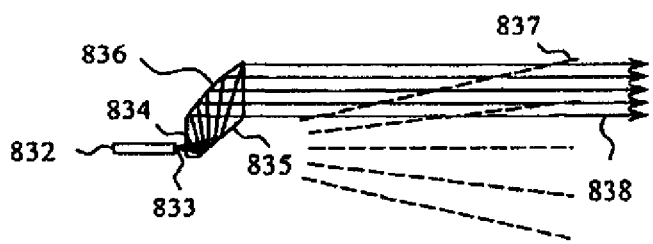
Figure 8:
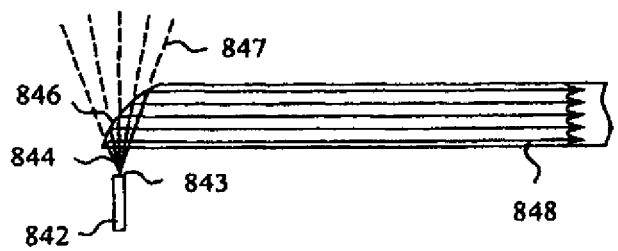
Figure 9:
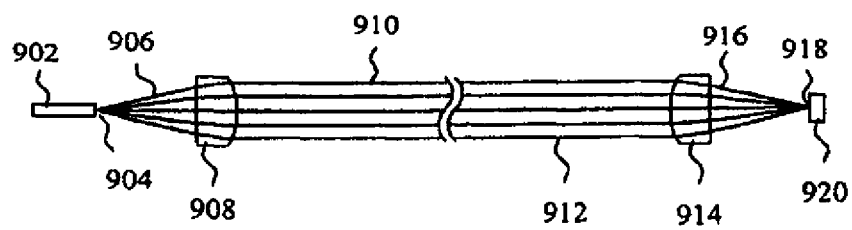
Figure 9:
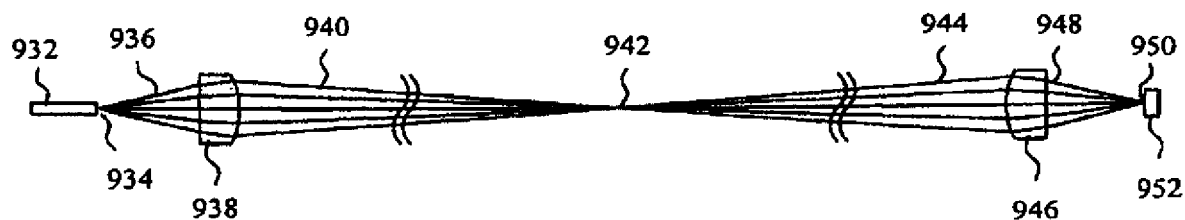

In FIG. 9(*a*), one embodiment of the optical path configuration for the collimating means and the focusing means based on aspects of the present invention is represented. The functionalities of such collimating means and focusing means have been fully described in the embodiments shown in FIG. 1 to FIG. 7, thus only the light path properties will be explained in detail. In FIG. 9(*a*), the input light 906 emits from the entrance aperture 904 that may be the core of the optical fiber 902 for input signal delivery, and propagates in divergence over a very short distance, then is intercepted by the lens 908, which, as the light passes through the lens, collimates the divergent light 906 only in the tangential plane, converting it into a partially collimated light, i.e., the anamorphic light 910 which is substantially collimated in the tangential plane, but remains slower divergent in the sagittal plane, leading to a propagation path that is two-dimensional. In reality, the collimation of the anamorphic light 910 in the tangential plane is merely an approximation. Precisely speaking, the anamorphic light 910 also has a very small amount of divergence in the tangential plane because of the finite height of the entrance aperture 904 that is the core of the optical fiber 902. The "speed" of the divergence is a function of the aperture height (here, it is the fiber core), the numerical aperture (NA) of the input beams 906, the focal length and the clear aperture of the lens 908 in the tangential plane. Being affected by these parameters, as the anamorphic light 910 propagates a certain distance (through other optical means not shown here) into the anamorphic light 912, its width in the tangential plane is slowly increasing. As the anamorphic light 912 is transmitted through the lens 914, it will be focused into the convergent light 916 in the tangential plane to form the spectral images 918 on the detector 920. Truncation on the light 912 by the lens 914 in the tangential plane will not happen unless the width of light 912 is larger than the clear aperture of lens 914 in the tangential plane. An exemplary calculation shows that, for a typical application scenario where the fiber core equals to 50 micron, NA is 0.22, the two lenses 908 and 914 have the same focal length of 8 mm, the maximum separating distance allowable between the two lenses 908 and 914 is approximately 240 mm in air without any beam truncation, if they both have the same clear aperture of 5 mm in the tangential plane, which is only approximately 2.1% of the path length. This makes it possible to construct a spectrometer of long optical path with small dimensional volume.

In FIG. 9(*b*), another embodiment of the optical path configuration for the collimating means and the focusing means according to aspects of the invention is represented. In FIG. 9(*b*), the input light 936 emits from the entrance aperture 934 that may be the core of the optical fiber 932 for input signal delivery, and propagates in divergence over a very short distance, then is transmitted through the lens 938, which converts the divergent light 936 into an anamorphic light 940, which is slowly convergent in the tangential plane, but remains divergent in the sagittal plane, leading to a propagation path that is substantially two-dimensional. As the anamorphic light 940 continues to propagate, it will form an intermediate focus at position 942 in the tangential plane. After passing point 942 (through other optical means not shown here), the anamorphic light 940 becomes another form of anamorphic light 944, which is slowly divergent in the tangential plane. As the anamorphic light 944 is transmitted through the lens 946, it will be focused into the convergent light 948 in the tangential plane to form the spectral images 950 on the detector 952. In fact, the height of the entrance aperture 934, the middle point 942 and the spectral image 950 represent three optically conjugated positions of the input object, the intermediate image and the final image. The two lenses 938 and 946 function as an image relay system of 1:1 magnification in the tangential plane. The same exemplary calculation results for no beam truncation as FIG. 9(*a*) are achieved for the same application scenario. This optical path configuration is applicable to all embodiments of spectrometers shown in FIG. 1 to FIG. 9 based on the present invention, and it still works well in the cases of FIGS. 7(*b*)~(*e*), even when the concave cylindrical/toroidal grating in each embodiment is replaced by a concave spherical grating, because of the symmetrical properties of this configuration.

The embodiments provided above and other potential embodiments with modifications based on this invention are particularly beneficial to compact spectrometers of small volumes. The associated optical technique has driven the merit of performance-volume of such a kind of spectrometer to its limit, as determined by the following parameter: (1) the input focal length of the spectrometer optics $f'_{IFL}$; (2) the height of the entrance aperture $\phi$, (3) the F/Number (or equivalently NA) of the input beam; (4) the co-efficient n for the total optical path length which is optical configuration dependent. The term "Dimension Improving Ratio (DIR)" may be used to show the significance of volume reduction for a spectrometer, which is defined as: DIR=A:B, where A is the reduced height of the spectrometer optics based on the technique of this invention, B is the height originally needed for the same spectrometer by existing technologies. The explicit expression of DIR is:

$$DIR \approx 2 \times \sqrt{\frac{n \times \phi \times F/\#}{f'_{IFL}}}$$

Here another embodiment of exemplary calculation is shown in details. It starts from the specifications of input parameters of: (1) the input focal length of the spectrometer optics: $f'_{IFL}$=65 mm; (2) the height of the entrance aperture: $\phi$=0.05 mm; (3) the F/Number of the input beam: F/2.27 (NA 0.22); (4) the co-efficient n for the total optical path length: n=4 for Czerny-Turner type or Fastie-Ebert type. The optimum focal length of the cylindrical element for the first collimating optics (same for the second focusing optics) is governed by: $f'_{1st} \approx (n \times \phi \times f'_{IFL} \times F/\#)^{1/2}$=5.43 mm. The smallest volumes of the optics of spectrometers possibly to achieve is: 65×65×4.8 mm³ (an 84% reduction compared with original volume of 65×65×29.4 mm³) with DIR=0.16. For a spectrometer of single concave grating configuration, n=2, leading to an optimum value for $f'_{1st}$=3.84 mm, and the smallest volumes of the optics of spectrometers possibly to achieve is 65×42×3.3 mm³ (a 89% reduction compared with original volume of 65×42×29.4 mm³) with DIR=0.11.

For purposes of this disclosure, an optical element is a component that performs at least one optical function. An optical member includes at least one optical element and performs at least one optical function. However, an optical member may include a plurality of optical elements that are integrated to perform a plurality of optical functions. For example, FIG. 1(*b*) illustrates optical elements 155, 158, 162, 166 and 169 that each perform a single optical function (i.e., first collimating, second collimating, dispersing, first focusing, and second focusing). Based on the configuration of the embodiment illustrated in FIG. 1(*b*), each optical element corresponds to a single optical member. In contrast, FIG. 6(*b*) illustrates optical elements 655, 658, and 662. However, as described above for FIG. 6(*b*), optical elements 655 and 658 perform two optical functions, respectively. Specifically, optical element 655 performs the first collimating and the second focusing. Optical element 658 performs the second collimating and the first focusing. Further, the embodiment illustrated in FIG. 6(*b*) includes at least three optical members—655, 658 and 662. Each optical member includes a single optical element, but as discussed above, the optical members corresponding to the optical elements 655 and 658 perform a plurality of optical functions. Additionally, FIG. 6(*c*) illustrates an embodiment that includes four optical elements and two optical members. In other words, the first optical member includes the optical elements 686, 688 and 695 and the second optical member includes 691. As discussed above with respect to FIG. 6(*c*), the optical element 688 performs two functions—the second collimating and the first focusing.

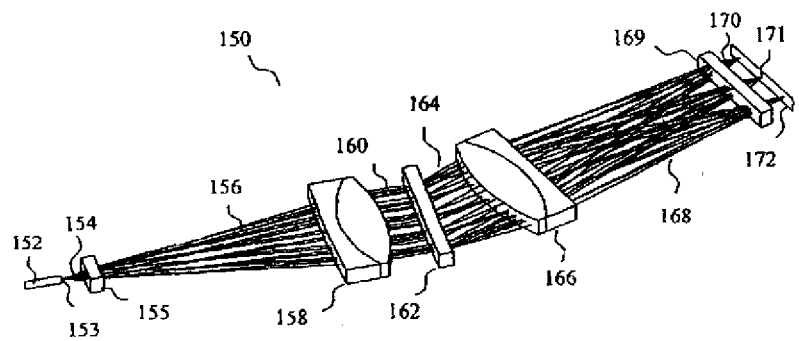

What is claimed is:

1. A method of forming a light distribution from an input light beam with a dispersion spectrometer, the method comprising:

(i) collimating the input light beam with a first toroidal optical element that collimates the light beam in a vertical plane without collimating the light beam in a horizontal plane that is substantially orthogonal to the vertical plane, to produce a partially collimated light beam;

(ii) producing a partially focused dispersed light beam from the partially collimated light beam, the partially focused dispersed light beam being focused in the horizontal plane without being focused in the vertical plane; and (iii) focusing the partially focused dispersed light beam in the vertical plane with an optical element that is different from an optical element that forms the partially focused dispersed light beam, to form the light distribution.

2. The method of claim 1, wherein both the collimating step (i) and the focusing step (iii) are each performed by transmissive optical elements or transmissive optical surfaces.

3. The method of claim 1, wherein the collimating step (i) is performed by a transmissive optical element or a transmissive optical surface, and the focusing step (iii) is performed by a reflective optical surface.

4. The method of claim 1, wherein the collimating step (i) is performed by a reflective optical surface, and the focusing step (iii) is performed by a transmissive optical element or a transmissive optical surface.

5. The method of claim 1, wherein both the collimating step (i) and the focusing step (iii) are each performed by reflective optical surfaces.

6. The method of claim 1, wherein the producing step (ii) is performed by a single optical element.

7. The method of claim 6, wherein the single optical element is a reflective surface.

8. The method of claim 7, wherein the collimating step (i) and the focusing step (iii) are performed by optical elements or surfaces that are separate from the reflective surface.

9. The method of claim 7, wherein the reflective surface is part of an optical member, the collimating step (i) and the focusing step (iii) being performed by different portions of the optical member.

10. The method of claim 7, wherein the collimating step (i) and the focusing step (iii) being performed by a single optical surface or optical member that is separate from the reflective surface.

11. The method of claim 1, wherein the producing step (ii) includes:
(a) dispersing the partially collimated light beam in the horizontal plane; and
(b) focusing the partially collimated dispersed light beam in the horizontal plane without focusing the light beam in the vertical plane to produce the partially focused dispersed light beam.

12. The method of claim 11, wherein both optical elements that perform step (a) and step (b) are transmissive.

13. The method of claim 11, wherein the optical element that performs step (a) is transmissive and the optical element that performs step (b) is reflective.

14. The method of claim 11, wherein the optical element that performs step (a) is reflective and the optical element that performs step (b) is transmissive.

15. The method of claim 11, wherein both optical elements that perform step (a) and (b) are reflective.

16. The method of claim 15, wherein the elements performing steps (i), (iii), (a) and (b) are part of a single optical member.

17. The method of claim 1, wherein the producing step (ii) includes:(a) focusing the partially collimated light beam in the horizontal plane without focusing the light beam in the vertical plane to produce the partially focused light beam; and(b) dispersing the partially focused light beam in the horizontal plane.

18. The method of claim 17, wherein both optical elements that perform step (a) and (b) are transmissive.

19. The method of claim 17, wherein the optical element that performs step (a) is transmissive and the optical element that performs step (b) is reflective.

20. The method of claim 17, wherein the optical element that performs step (a) is reflective and the optical element that performs step (b) is transmissive.

21. The method of claim 17, wherein both optical elements that perform step (a) and (b) are reflective.

22. The method of claim 21, wherein the elements performing steps (i), (iii), (a) and (b) are part of a single optical member.

23. The method of claim 1, wherein the producing step (ii) includes:
(a) collimating the partially collimated light beam in the horizontal plane with an optical element different from the first optical element to produce a collimated light beam;
(b) dispersing the collimated light beam to produce a dispersed light beam in the horizontal plane; and
(c) focusing the dispersed light beam in the horizontal plane without focusing the dispersed light beam in the vertical plane to produce the partially focused dispersed light beam.

24. The method of claim 23, wherein steps (i), (iii), (a), (b) and (c) are performed by five separate optical members.

25. The method of claim 23, wherein steps (i), (iii), (a), (b) and (c) are performed by five separate optical elements.

26. The method of claim 23, wherein the optical elements that perform steps (a), (b) and (c) are transmissive.

27. The method of claim 23, wherein the optical elements that perform steps (a) and (b) are transmissive, and the optical element that performs step (c) is reflective.

28. The method of claim 23, wherein the optical elements that perform steps (a) and (c) are transmissive, and the optical element that performs step (b) is reflective.

29. The method of claim 28, wherein the elements performing steps (i), (iii), (a) and (c) are part of a single optical member.

30. The method of claim 23, wherein the optical element that performs step (a) is transmissive, and the optical elements that perform steps (b) and (c) are reflective.

31. The method of claim 23, wherein the optical element that performs step (a) is reflective, and the optical elements that perform steps (b) and (c) are transmissive.

32. The method of claim 23, wherein the optical elements that perform steps (a) and (c) are reflective, and the optical element that performs step (b) is transmissive.

33. The method of claim 23, wherein the optical elements that perform steps (a) and (b) are reflective, and the optical element that performs step (c) is transmissive.

34. The method of claim 23, wherein the optical elements that perform steps (a), (b) and (c) are reflective.

35. The method of claim 34, wherein the elements performing steps (i), (iii), (a), (b) and (c) are part of a single optical member.

36. The method of claim 23, wherein steps (a) and (c) are performed by a single optical element.

37. A spectrometer that forms a light distribution on a detection plane from an input light beam, the spectrometer comprising:
(i) first collimating optics that collimates the input light beam with a toroidal optical element that collimates the light beam in a vertical plane without collimating the input light beam in a horizontal plane that is substantially orthogonal to the vertical plane so as to produce a partially collimated light beam;

(ii) light beam collimating-dispersing-focusing optics that produces a partially focused dispersed light beam from the partially collimated light beam, the partially focused dispersed light beam being focused in the horizontal plane without being focused in the vertical plane; and (iii) second focusing optics that focuses the partially focused dispersed light beam in the vertical plane to form the light distribution on the detection plane.

38. The spectrometer of claim 37, wherein both the first collimating optics (i) and the second focusing optics (ii) are transmissive.

39. The spectrometer of claim 37, wherein the first collimating optics (i) is transmissive and the second focusing optics (iii) is reflective.

40. The spectrometer of claim 37, wherein the first collimating optics (i) is reflective and the second focusing optics (iii) is transmissive.

41. The spectrometer of claim 37, wherein both the first collimating optics (i) and second focusing optics (iii) are reflective.

42. The spectrometer of claim 37, wherein the light beam collimating-dispersing-focusing optics (ii) is a single optical element.

43. The dispersion spectrometer of claim 42, wherein the single optical element is a reflective surface.

44. The spectrometer of claim 43, wherein the reflective surface is part of a first optical member, and the first collimating optics (i) and the second focusing optics (iii) are portions of at least one second optical member that is separate from the first optical member.

45. The spectrometer of claim 43, wherein the reflective surface is part of an optical member, and the first collimating optics (i) and the second focusing optics (iii) are different portions of the optical member.

46. The method of claim 43, wherein the first collimating optics (i) and the second focusing optics (iii) being performed by a single optical surface or optical member that is separate from the reflective surface.

47. The spectrometer of claim 37, wherein the light beam collimating-dispersing-focusing optics comprises:
(a) dispersing optics that disperses in the horizontal plane the partially collimated light beam to form a dispersed light beam; and
(b) first focusing optics that focuses the dispersed light beam in the horizontal plane without focusing the dispersed light beam in the vertical plane, to produce the partially focused dispersed light beam.

48. The spectrometer of claim 47, wherein the dispersing optics (a) and the first focusing optics (b) each are transmissive.

49. The spectrometer of claim 47, wherein the dispersing optics (a) is transmissive and the first focusing optics (b) is reflective.

50. The spectrometer of claim 47, wherein the dispersing optics (a) is reflective and the first focusing optics (b) is transmissive.

51. The spectrometer of claim 47, wherein the dispersing optics (a) and the first focusing optics (b) each are reflective.

52. The spectrometer of claim 51, wherein the first collimating optics (i), the dispersing optics (a), the first focusing optics (b) and the second focusing optics (iii) are part of a single optical member.

53. The spectrometer of claim 37, wherein the light beam collimating-dispersing-focusing optics comprises:
(a) first focusing optics that focuses the partially collimated light beam in the horizontal plane without focusing the dispersed light beam in the vertical plane, to produce the partially focused light beam; and
(b) dispersing optics that disperses in the horizontal plane the partially focused light beam to form a dispersed light beam.

54. The spectrometer of claim 53, wherein the first focusing optics (a) and the dispersing optics (b) each are transmissive.

55. The spectrometer of claim 53, wherein the first focusing optics (a) is transmissive and the dispersing optics (b) is reflective.

56. The spectrometer of claim 53, wherein the first focusing optics (a) is reflective and the dispersing optics (b) is transmissive.

57. The spectrometer of claim 53, wherein the first focusing optics (a) and the dispersing optics (b) each are reflective.

58. The spectrometer of claim 57, wherein the first collimating optics (i), the first focusing optics (a), the dispersing optics (b) and the second focusing optics (iii) are part of a single optical member.

59. The spectrometer of claim 37, wherein the light beam collimating-dispersing-focusing optics comprises:
(a) second collimating optics that receives the partially collimated light beam from the first collimating optics, and collimates the partially collimated light beam in the horizontal plane to produce a collimated light beam;
(b) dispersing optics that disperses the collimated light beam in the horizontal plane to form a dispersed light beam; and
(c) first focusing optics that focuses the dispersed light beam in the horizontal plane without focusing the dispersed light beam in the vertical plane, to produce the partially focused dispersed light beam.

60. The spectrometer of claim 59, wherein the second collimating optics (a), the dispersing optics (b) and the first focusing optics (c) each are transmissive.

61. The spectrometer of claim 59, wherein the second collimating optics (a) and the dispersing optics (b) are transmissive, and the first focusing optics (c) is reflective.

62. The spectrometer of claim 59, wherein the second collimating optics (a) and the first focusing optics (c) are transmissive, and the dispersing optics (b) is reflective.

63. The spectrometer of claim 62, wherein the first collimating optics (i), the second collimating optics (a), the first focusing optics (c) and the second focusing optics (iii) are part of a single optical member.

64. The spectrometer of claim 59, wherein the second collimating optics (a) is transmissive, and both the dispersing optics (b) and the first focusing optics (c) are reflective.

65. The spectrometer of claim 59, wherein the second collimating optics (a) is reflective, and both the dispersing optics (b) and the first focusing optics (c) are transmissive.

66. The spectrometer of claim 59, wherein the second collimating optics (a) and the first focusing optics (c) are reflective, and the dispersing optics (b) is transmissive.

67. The spectrometer of claim 59, wherein the second collimating optics (a) and the dispersing optics (b) are reflective, and the first focusing optics (c) is transmissive.

68. The spectrometer of claim 59, wherein the second collimating optics (a), the dispersing optics (b) and the first focusing optics (c) each are reflective.

69. The spectrometer of claim 68, wherein the first collimating optics (i), the second collimating optics (a), the dispersing optics (b), the first focusing optics (c) and the second focusing optics (iii) are part of a single optical member.

70. The spectrometer of claim 59, wherein the second collimating optics (a) and the first focusing optics (c) are performed by a single optical element.

71. The spectrometer of claim 37, further comprising: an entrance aperture.

72. The spectrometer of claim 71, wherein the entrance aperture is at least one of:
(a) at least one core of a single-mode fiber;
(b) at least one core of a multi-mode fiber;
(c) at least one pinhole having a diameter approximately equal to the diameter of single-mode fibers;
(d) at least one pinhole having a diameter approximately equal to the diameter of multi-mode fibers;
(e) a slit having a width approximately equal to the diameter of single-mode fibers;
(f) a slit having a width approximately equal to the diameter of multi-mode fibers.

73. The spectrometer of claim 37, wherein at least one of the first collimating optics (i), the collimating-dispersing-focusing optics (ii), and the second focusing optics (iii) is an optical element or surface having a main optical power in one of the vertical plane or the horizontal plane.

74. The spectrometer of claim 73, wherein the optical element or surface is one of:
(a) a concave cylindrical mirror of spherical cross-section;
(b) a concave cylindrical mirror of aspherical cross-section;
(c) a concave toroidal mirror having at least one of a spherical and an aspherical cross-section;
(d) a positive cylindrical lens having at least one of a plano, a spherical and an aspherical cross-section; and
(e) a positive toroidal lens having at least one of a plano, a spherical and an aspherical cross-section.

75. The spectrometer of claim 73, wherein the optical element or surface is one of:
(a) a one-dimensional, transmissive grating of at least one of (I) a planar substrate; (II) a concave substrate; (III) a convex substrate; (IV) a cylindrical substrate; (V) a toroidal substrate; and (VI) a spherical substrate;
(b) a one-dimensional, reflective grating of at least one of (I) a planar substrate; (II) a concave substrate; (III) a convex substrate; (IV) a cylindrical substrate; (V) a toroidal substrate; and (VI) a spherical substrate;
(c) a prism; and
(d) a grism.

\* \* \* \* \*

UNITED STATES PATENT AND TRADEMARK OFFICE
CERTIFICATE OF CORRECTION

PATENT NO. : 7,817,274 B2
APPLICATION NO. : 12/149563
DATED : October 19, 2010
INVENTOR(S) : Jingyun Zhang Page 1 of 11

It is certified that error appears in the above-identified patent and that said Letters Patent is hereby corrected as shown below:

Please add Figures 3C-E, 4C, 4D, 5C, 6C, 7C-E, 8A-E, 9A and 9B (attached).

Please correct column 18, line 15 of the specification as follows:

"...in forms of torodial, cylindrical and planar surface,..."

Signed and Sealed this
Tenth Day of May, 2011

David J. Kappos
*Director of the United States Patent and Trademark Office*

UNITED STATES PATENT AND TRADEMARK OFFICE
CERTIFICATE OF CORRECTION

PATENT NO. : 7,817,274 B2
APPLICATION NO. : 12/149563
DATED : October 19, 2010
INVENTOR(S) : Jingyun Zhang It is certified that error appears in the above-identified patent and that said Letters Patent is hereby corrected as shown below:

Delete the title page and substitute therefore the attached title page showing the corrected number of drawing sheets in patent.

Delete Drawing Sheets 1-7 and substitute therefore the attached Drawing Sheets 1-17 consisting of added Figs 3C-E, 4C, 4D, 5C, 6C, 7C-E, 8A-E, 9A and 9B.

Please correct column 18, line 15 of the specification as follows:
"...in forms of torodial, cylindrical and planar surface,..."

This certificate supersedes the Certificate of Correction issued May 10, 2011.

Signed and Sealed this
Seventh Day of June, 2011

David J. Kappos
*Director of the United States Patent and Trademark Office*

CERTIFICATE OF CORRECTION (continued)

(12) United States Patent
Zhang

(10) Patent No.: US 7,817,274 B2
(45) Date of Patent: Oct. 19, 2010

(54) COMPACT SPECTROMETER

(76) Inventor: Jingyun Zhang, 2490 Partridge Dr., Upper St. Clair, PA (US) 15241

(*) Notice: Subject to any disclaimer, the term of this patent is extended or adjusted under 35 U.S.C. 154(b) by 151 days.

(21) Appl. No.: 12/149,563

(22) Filed: May 5, 2008

(65) Prior Publication Data
US 2009/0091754 A1    Apr. 9, 2009

Related U.S. Application Data

(60) Provisional application No. 60/997,983, filed on Oct. 5, 2007.

(51) Int. Cl.
*G01J 3/28* (2006.01)
(52) U.S. Cl. .................................................. 356/328
(58) Field of Classification Search ................ None
See application file for complete search history.

(56) References Cited

U.S. PATENT DOCUMENTS

| | | |
|---|---|---|
| 887,357 A | 5/1908 | Stubblefield |
| 2,723,589 A | 11/1955 | Bullock et al. |
| 3,572,933 A | 3/1971 | Boostrom |
| 3,578,866 A | 5/1971 | Kohler et al. |
| 3,625,615 A | 12/1971 | Wilson |
| 3,663,762 A | 5/1972 | Joel |
| 3,680,957 A | 8/1972 | Fukuda |
| 3,775,010 A | 11/1973 | Chupp et al. |
| 3,888,590 A | 6/1975 | White |
| 3,906,166 A | 9/1975 | Cooper et al. |
| 3,917,403 A | 11/1975 | Chupp et al. |
| 3,923,399 A | 12/1975 | Brumley |
| 4,025,196 A | 5/1977 | Chupp et al. |
| 4,043,670 A | 8/1977 | Kozlov et al. |
| 4,225,233 A | 9/1980 | Ogan |
| 4,310,244 A | 1/1982 | Perkins et al. |
| 4,315,691 A | 2/1982 | Perkins et al. |
| 4,399,555 A | 8/1983 | MacDonald et al. |

(Continued)

FOREIGN PATENT DOCUMENTS

EP    1 528 380 A1    5/2005

(Continued)

OTHER PUBLICATIONS

Carl Zeiss, "Monolithic Miniature Spectrometer—MMS 1," Photonics Spectra, May 1994, p. 91.

(Continued)

*Primary Examiner*—Tu T Nguyen
(74) *Attorney, Agent, or Firm*—Oliff & Berridge, PLC

(57) ABSTRACT

Spectrometers, particularly compact spectrometers, are constructed with their spectral performance characteristics being optimized as well as with their instrument/device volume being reduced significantly. The light propagation path, either in transparent media or in free space, of the optical beams emitting from a small input aperture/slit of a spectrometer, is caused to be two-dimensional or unilateralized (propagating within a thin layer of air or media), enabling physical sizes of any optical elements needed thereafter to construct a spectrometer to be reduced significantly in one dimension. As a result, a significant reduction of instrument/device volume (in one dimension or even in two dimensions) is achieved, which is applicable to and beneficial to either a classical dispersion spectrometer or a compact dispersion spectrometer.

75 Claims, 17 Drawing Sheets